United States Patent
Yerramalli et al.

(10) Patent No.: US 11,659,593 B2
(45) Date of Patent: May 23, 2023

(54) PROCEDURES FOR AUTONOMOUS UPLINK TRANSMISSIONS

(71) Applicant: QUALCOMM Incorporated, San Diego, CA (US)

(72) Inventors: Srinivas Yerramalli, San Diego, CA (US); Xiaoxia Zhang, San Diego, CA (US); Jing Sun, San Diego, CA (US); Seyed Ali Akbar Fakoorian, San Diego, CA (US); Arumugam Chendamarai Kannan, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/653,190

(22) Filed: Mar. 2, 2022

(65) Prior Publication Data
US 2022/0191926 A1 Jun. 16, 2022

Related U.S. Application Data

(62) Division of application No. 16/654,825, filed on Oct. 16, 2019, now Pat. No. 11,291,046.

(30) Foreign Application Priority Data

Oct. 18, 2018 (IN) .............................. 201841039526

(51) Int. Cl.
*H04W 74/08* (2009.01)
*H04W 16/14* (2009.01)
(Continued)

(52) U.S. Cl.
CPC ....... *H04W 74/0808* (2013.01); *H04L 5/0055* (2013.01); *H04W 16/14* (2013.01); *H04W 72/0446* (2013.01)

(58) Field of Classification Search
None
See application file for complete search history.

(56) References Cited

U.S. PATENT DOCUMENTS 10,251,201 B2   4/2019  Cheng et al.
10,362,593 B2 *  7/2019  Salem ................. H04W 74/006
(Continued)

FOREIGN PATENT DOCUMENTS

DE                20061 A  * 11/2021
WO   WO-2019027297 A1 *  2/2019  ............ H04W 16/14
WO   WO-2019056368 A1 *  3/2019  ............ H04L 1/1812

OTHER PUBLICATIONS

"3rd Generation Partnership Project; Technical Specification Group GSM/EDGE Radio Access Network; Feasibility Study for Evolved GSM/EDGE Radio Access Network (GERAN)(Release 7)", 3GPP Draft, GP-052574, Feasibility study 45912 V030, 3RD Generation Partnership Project (3GPP), Mobile Competence Centre, 650, Route Des Lucioles, F-06921 Sophia-Antipolis Cedex, France, vol. TSG GERAN, No. Atlanta, Nov. 6, 2005, Nov. 6, 2005 (Nov. 6, 2005), XP050015279, 148 pages, [retrieved on Nov. 6, 2005] 10.2.1.2 Event based RLC ACK/NACK reports.

(Continued)

*Primary Examiner* — Kenny S Lin
(74) *Attorney, Agent, or Firm* — Norton Rose Fulbright US LLP

(57) ABSTRACT

Various procedures associated with autonomous uplink (AUL) are disclosed. In order to address the mismatch between listen before talk (LBT) and AUL bandwidth a fractional sensing channel is defined less than 20 MHz. Accordingly, a user equipment (UE) may use the fractional sensing channel to perform LBT only on the resources allocated for AUL. Contention window update may further be modified for transmissions spanning multiple transmission opportunities (TxOPs). A contention window update (Continued)

may occur over all transmission channels considering full acknowledgement information of each TxOP, a percentage of acknowledgement information weighted on the number of channels, a percentage of acknowledgement information weighted on the ratio of resources on each channel, or by selecting a primary channel of the multiple channels for the contention window update. In repetition scenarios, the reference transmission for contention window updates may be selected depending on whether all repetitions are within one or multiple TxOPs.

30 Claims, 16 Drawing Sheets

(51) Int. Cl.
    *H04W 72/0446* (2023.01)
    *H04L 5/00* (2006.01)

(56) References Cited

U.S. PATENT DOCUMENTS

| | | |
|---|---|---|
| 10,681,744 B2 | 6/2020 | Kim et al. |
| 2015/0257174 A1 | 9/2015 | Liu |
| 2016/0278088 A1 | 9/2016 | Cheng et al. |
| 2017/0188387 A1 | 6/2017 | Mukherjee et al. |
| 2018/0124828 A1 | 5/2018 | Kim et al. |
| 2018/0242360 A1 | 8/2018 | Noh et al. |
| 2019/0053274 A1 | 2/2019 | Kim et al. |
| 2020/0128583 A1 | 4/2020 | Yerramalli et al. |
| 2020/0344819 A1 | 10/2020 | Myung et al. |

OTHER PUBLICATIONS

Intel Corporation: "Summary of Email Discussion [91-LTE-03] on Channel Access for AUL", 3GPP Draft, 3GPP TSG RAN WG1 Meeting #92, R1-1802362, Email Discussion [91-LTE-03] on Channel Access for AUL, 3RD Generation Partnership Project (3GPP), Mobile Competence Centre, 650, Route Des Lucioles, F-06921 Sophia-Antipolis Cedex, vol. RAN WG1, No. Athens, Greece, Feb. 26-Mar. 2, 2018, Feb. 17, 2018 (Feb. 17, 2018), XP051397887, 18 pages, Retrieved from the Internet: URL: http://www.3gpp.org/ftp/tsg%5Fran/WG1%5FRL1/TSGR1%5F92/Docs/. [retrieved on Feb. 17, 2018] p. 10. lines 1-9.
Interdigital Inc: "HARQ Enhancements for NR-U", 3GPP Draft, 3GPP TSG RAN WG 1 Meeting #94bis, R1-1811206 HARQ Enhancements for NR-U, 3rd Generation Partnership Project (3GPP), Mobile Competence Centre, 650, Route Des Lucioles, F-06921, Sophia-Antipolis Cedex, France, Sophia-Antipolis Cedex, France, 2018 (Sep. 29, 2018), XP051518607, Chengdu, Chine, Oct. 8-12, 2018, 6 Pages, Retrieved from the Internet: URL: http://www.3gpp.org/ftp/tsg%5Fran/WG1%5FRL1/TSGR1%5F94b/Docs/R1%2D1811206%2Ezip [retrieved on Sep. 29, 2018] p. 2, 2 Multiple HARQ Feedback Transmission Opportunities.
International Search Report and Written Opinion—PCT/US2019/056694—ISA/EPO—dated Apr. 8, 2020.
International Preliminary Report on Patentability—PCT/US2019/056694 The International Bureau of WIPO—Geneva, Switzerland, dated Apr. 29, 2021.
NTT DOCOMO, et al., "Channel Access Procedures for NR-U Operation," 3GPP Draft, 3GPP TSG RAN WG1 Meeting #94bis, R1-1811369_Channel Access Procedures for NR-U Operation_Final, 3RD Generation Partnership, Project (3GPP), Mobile Competence Centre, 650, Route Des Lucioles ; F-06921 Sophia-Antipolis Cedex, vol. RAN WG1, No. Chengdu, China; Oct. 8-12, 2018, Sep. 29, 2018 (Sep. 29, 2018), XP051518772, 4 pages, Retrieved from the Internet: URL: http://www.3gpp.org/ftp/tsg%5Fran/WG1%5FRL1/TSGR1%5F94b/Docs/R1%2D1811369%2Ezip [retrieved on Sep. 29, 2018] p. 1, 1 Introduction, Agreements.
Partial International Search Report—PCT/US2019/056694—ISA/EPO—dated Jan. 29, 2020.

* cited by examiner

PROCEDURES FOR AUTONOMOUS UPLINK TRANSMISSIONS

CROSS-REFERENCE TO RELATED APPLICATIONS

This application is a divisional of and claims the benefit of U.S. patent application Ser. No. 16/654,825, entitled "PROCEDURES FOR AUTONOMOUS UPLINK TRANSMISSIONS," filed on Oct. 16, 2019, and also claims the benefit of India Application No. 201841039526, entitled, "PROCEDURES FOR AUL TRANSMISSIONS," filed on Oct. 18, 2018, both of which are expressly incorporated by reference herein in their entirety.

BACKGROUND

Field

Aspects of the present disclosure relate generally to wireless communication systems, and more particularly, to procedures for operation of autonomous uplink (AUL) transmissions.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3$^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a user equipment (UE), to transmit uplink data with an autonomous uplink (AUL) transmission on a set of pre-allocated AUL resources of shared communication spectrum, wherein the set pre-allocated AUL resources spans one or more transmission opportunities, performing, by the UE, a listen before talk (LBT) procedure on a plurality of sensing channels making up the set of pre-allocated AUL resources, wherein each of the sensing channels of the plurality of sensing channels has a bandwidth equal to the channel sensing bandwidth, detecting, by the UE, a success of the LBT procedure on one or more sensing channels of the plurality of sensing channels, and autonomously transmitting, by the UE, the uplink data on the one or more sensing channels of the pre-allocated AUL resources.

In an additional aspect of the disclosure, a method of wireless communication includes transmitting, by a transmitter, data in a transmission on shared communication spectrum using a set of allocated resources, wherein the set of allocated resources spans a plurality of transmission channels within a plurality of transmission opportunities, and adjusting, by the transmitter, a contention window size of one or more of the plurality of transmission channels for subsequent transmission opportunities based on acknowledgement information from a receiver for each of the plurality of transmission channels.

In an additional aspect of the disclosure, a method of wireless communication includes receiving, by a UE, a repetition configuration signal from a serving base station, wherein the repetition configuration signal identifies a number of transmission repetitions for AUL transmissions of the UE, transmitting, by the UE, AUL transmission data in a plurality of uplink transmission slots across one or more transmission opportunities of a shared communication spectrum, wherein the plurality of uplink transmissions correspond to the number of transmission repetitions, receiving, by the UE, acknowledgement information associated with AUL transmission data, and updating, by the UE, a contention window size for subsequent transmission opportunities based on the acknowledgement information.

In an additional aspect of the disclosure, a method of wireless communication includes receiving, by a UE, a repetition configuration signal from a serving base station, wherein the repetition configuration signal identifies a number of transmission repetitions for AUL transmissions of the UE, and transmitting, by the UE, AUL transmission data in a plurality of uplink transmission slots across one or more transmission opportunities of a shared communication spectrum, wherein the plurality of uplink transmissions correspond to the number of transmission repetitions, and an uplink control indicator signal along with the AUL transmission data in one or more of the plurality of uplink transmission slots.

In an additional aspect of the disclosure, a method of wireless communication includes signaling, by a base station, a repetition configuration signal to one or more served UEs, wherein the repetition configuration signal identifies a number of transmission repetitions for AUL transmissions of the one or more served UEs, detecting, by a base station, one or more AUL transmissions from a served UE across one or more transmission opportunities of a shared communication spectrum, and detecting, by the base station, an uplink control indicator signal along with the one or more AUL transmissions in one uplink transmission slot of a plurality of uplink transmission slots available for AUL transmissions.

In an additional aspect of the disclosure, an apparatus configured for wireless communication includes means for determining, by a UE, to transmit uplink data with an AUL transmission on a set of pre-allocated AUL resources of shared communication spectrum, wherein the set pre-allocated AUL resources spans one or more transmission opportunities, means for performing, by the UE, a LBT procedure on a plurality of sensing channels making up the set of pre-allocated AUL resources, wherein each of the sensing channels of the plurality of sensing channels has a bandwidth equal to the channel sensing bandwidth, means for detecting, by the UE, a success of the LBT procedure on one or more sensing channels of the plurality of sensing channels, and means for autonomously transmitting, by the UE, the uplink data on the one or more sensing channels of the pre-allocated AUL resources.

In an additional aspect of the disclosure, an apparatus configured for wireless communication includes means for transmitting, by a transmitter, data in a transmission on shared communication spectrum using a set of allocated resources, wherein the set of allocated resources spans a plurality of transmission channels within a plurality of transmission opportunities, and means for adjusting, by the transmitter, a contention window size of one or more of the plurality of transmission channels for subsequent transmission opportunities based on acknowledgement information from a receiver for each of the plurality of transmission channels.

In an additional aspect of the disclosure, an apparatus configured for wireless communication includes means for receiving, by a UE, a repetition configuration signal from a serving base station, wherein the repetition configuration signal identifies a number of transmission repetitions for AUL transmissions of the UE, means for transmitting, by the UE, AUL transmission data in a plurality of uplink transmission slots across one or more transmission opportunities of a shared communication spectrum, wherein the plurality of uplink transmissions correspond to the number of transmission repetitions, means for receiving, by the UE, acknowledgement information associated with AUL transmission data, and means for updating, by the UE, a contention window size for subsequent transmission opportunities based on the acknowledgement information.

In an additional aspect of the disclosure, an apparatus configured for wireless communication includes means for receiving, by a UE, a repetition configuration signal from a serving base station, wherein the repetition configuration signal identifies a number of transmission repetitions for AUL transmissions of the UE, and means for transmitting, by the UE, AUL transmission data in a plurality of uplink transmission slots across one or more transmission opportunities of a shared communication spectrum, wherein the plurality of uplink transmissions correspond to the number of transmission repetitions, and an uplink control indicator signal along with the AUL transmission data in one or more of the plurality of uplink transmission slots.

In an additional aspect of the disclosure, an apparatus configured for wireless communication includes means for signaling, by a base station, a repetition configuration signal to one or more served UEs, wherein the repetition configuration signal identifies a number of transmission repetitions for AUL transmissions of the one or more served UEs, means for detecting, by a base station, one or more AUL transmissions from a served UE across one or more transmission opportunities of a shared communication spectrum, and means for detecting, by the base station, an uplink control indicator signal along with the one or more AUL transmissions in one uplink transmission slot of a plurality of uplink transmission slots available for AUL transmissions.

In an additional aspect of the disclosure, a non-transitory computer-readable medium having program code recorded thereon. The program code further includes code to determine, by a UE, to transmit uplink data with an AUL transmission on a set of pre-allocated AUL resources of shared communication spectrum, wherein the set pre-allocated AUL resources spans one or more transmission opportunities, code to perform, by the UE, a LBT procedure on a plurality of sensing channels making up the set of pre-allocated AUL resources, wherein each of the sensing channels of the plurality of sensing channels has a bandwidth equal to the channel sensing bandwidth, code to detect, by the UE, a success of the LBT procedure on one or more sensing channels of the plurality of sensing channels, and code to autonomously transmit, by the UE, the uplink data on the one or more sensing channels of the pre-allocated AUL resources.

In an additional aspect of the disclosure, a non-transitory computer-readable medium having program code recorded thereon. The program code further includes code to transmit, by a transmitter, data in a transmission on shared communication spectrum using a set of allocated resources, wherein the set of allocated resources spans a plurality of transmission channels within a plurality of transmission opportunities, and code to adjust, by the transmitter, a contention window size of one or more of the plurality of transmission channels for subsequent transmission opportunities based on acknowledgement information from a receiver for each of the plurality of transmission channels.

In an additional aspect of the disclosure, a non-transitory computer-readable medium having program code recorded thereon. The program code further includes code to receive, by a UE, a repetition configuration signal from a serving base station, wherein the repetition configuration signal identifies a number of transmission repetitions for AUL transmissions of the UE, code to transmit, by the UE, AUL transmission data in a plurality of uplink transmission slots across one or more transmission opportunities of a shared communication spectrum, wherein the plurality of uplink transmissions correspond to the number of transmission repetitions, code to receive, by the UE, acknowledgement information associated with AUL transmission data, and code to update, by the UE, a contention window size for subsequent transmission opportunities based on the acknowledgement information.

In an additional aspect of the disclosure, a non-transitory computer-readable medium having program code recorded thereon. The program code further includes code to receive, by a UE, a repetition configuration signal from a serving base station, wherein the repetition configuration signal identifies a number of transmission repetitions for AUL transmissions of the UE, and code to transmit, by the UE, AUL transmission data in a plurality of uplink transmission slots across one or more transmission opportunities of a shared communication spectrum, wherein the plurality of uplink transmissions correspond to the number of transmission repetitions, and an uplink control indicator signal along with the AUL transmission data in one or more of the plurality of uplink transmission slots.

In an additional aspect of the disclosure, a non-transitory computer-readable medium having program code recorded thereon. The program code further includes code to signal, by a base station, a repetition configuration signal to one or more served UEs, wherein the repetition configuration signal identifies a number of transmission repetitions for AUL transmissions of the one or more served UEs, code to detect, by a base station, one or more AUL transmissions from a served UE across one or more transmission opportunities of a shared communication spectrum, and code to detect, by the base station, an uplink control indicator signal along with the one or more AUL transmissions in one uplink transmission slot of a plurality of uplink transmission slots available for AUL transmissions.

In an additional aspect of the disclosure, an apparatus configured for wireless communication is disclosed. The apparatus includes at least one processor, and a memory coupled to the processor. The processor is configured to determine, by a UE, to transmit uplink data with an AUL transmission on a set of pre-allocated AUL resources of shared communication spectrum, wherein the set pre-allocated AUL resources spans one or more transmission opportunities, to perform, by the UE, a LBT procedure on a plurality of sensing channels making up the set of pre-allocated AUL resources, wherein each of the sensing channels of the plurality of sensing channels has a bandwidth equal to the channel sensing bandwidth, to detect, by the UE, a success of the LBT procedure on one or more sensing channels of the plurality of sensing channels, and to autonomously transmit, by the UE, the uplink data on the one or more sensing channels of the pre-allocated AUL resources.

In an additional aspect of the disclosure, an apparatus configured for wireless communication is disclosed. The apparatus includes at least one processor, and a memory coupled to the processor. The processor is configured to transmit, by a transmitter, data in a transmission on shared communication spectrum using a set of allocated resources, wherein the set of allocated resources spans a plurality of transmission channels within a plurality of transmission opportunities, and to adjust, by the transmitter, a contention window size of one or more of the plurality of transmission channels for subsequent transmission opportunities based on acknowledgement information from a receiver for each of the plurality of transmission channels.

In an additional aspect of the disclosure, an apparatus configured for wireless communication is disclosed. The apparatus includes at least one processor, and a memory coupled to the processor. The processor is configured to receive, by a UE, a repetition configuration signal from a serving base station, wherein the repetition configuration signal identifies a number of transmission repetitions for AUL transmissions of the UE, to transmit, by the UE, AUL transmission data in a plurality of uplink transmission slots across one or more transmission opportunities of a shared communication spectrum, wherein the plurality of uplink transmissions correspond to the number of transmission repetitions, to receive, by the UE, acknowledgement information associated with AUL transmission data, and to update, by the UE, a contention window size for subsequent transmission opportunities based on the acknowledgement information.

In an additional aspect of the disclosure, an apparatus configured for wireless communication is disclosed. The apparatus includes at least one processor, and a memory coupled to the processor. The processor is configured to receive, by a UE, a repetition configuration signal from a serving base station, wherein the repetition configuration signal identifies a number of transmission repetitions for AUL transmissions of the UE, and to transmit, by the UE, AUL transmission data in a plurality of uplink transmission slots across one or more transmission opportunities of a shared communication spectrum, wherein the plurality of uplink transmissions correspond to the number of transmission repetitions, and an uplink control indicator signal along with the AUL transmission data in one or more of the plurality of uplink transmission slots.

In an additional aspect of the disclosure, an apparatus configured for wireless communication is disclosed. The apparatus includes at least one processor, and a memory coupled to the processor. The processor is configured to signal, by a base station, a repetition configuration signal to one or more served UEs, wherein the repetition configuration signal identifies a number of transmission repetitions for AUL transmissions of the one or more served UEs, to detect, by a base station, one or more AUL transmissions from a served UE across one or more transmission opportunities of a shared communication spectrum, and to detect, by the base station, an uplink control indicator signal along with the one or more AUL transmissions in one uplink transmission slot of a plurality of uplink transmission slots available for AUL transmissions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
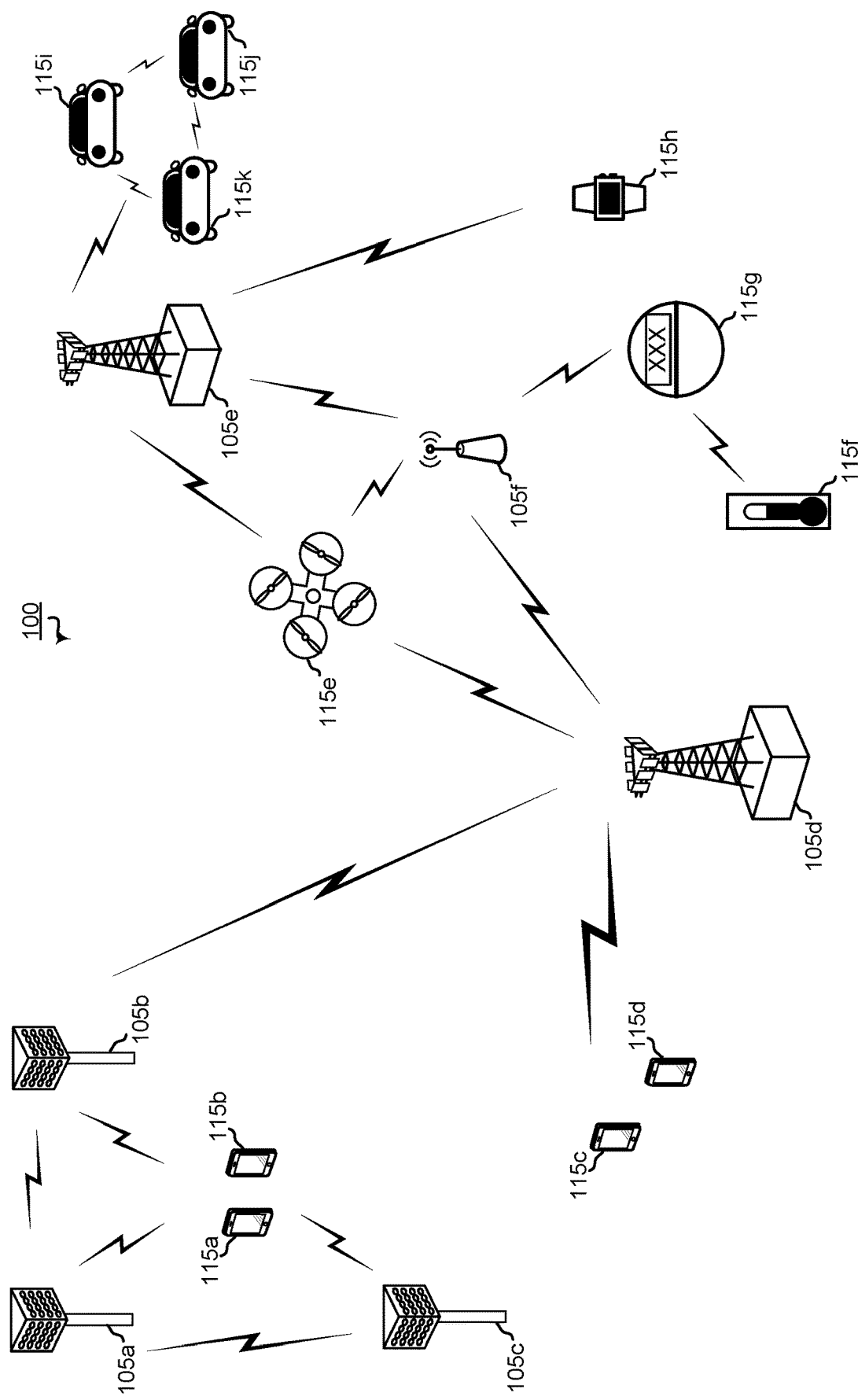
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
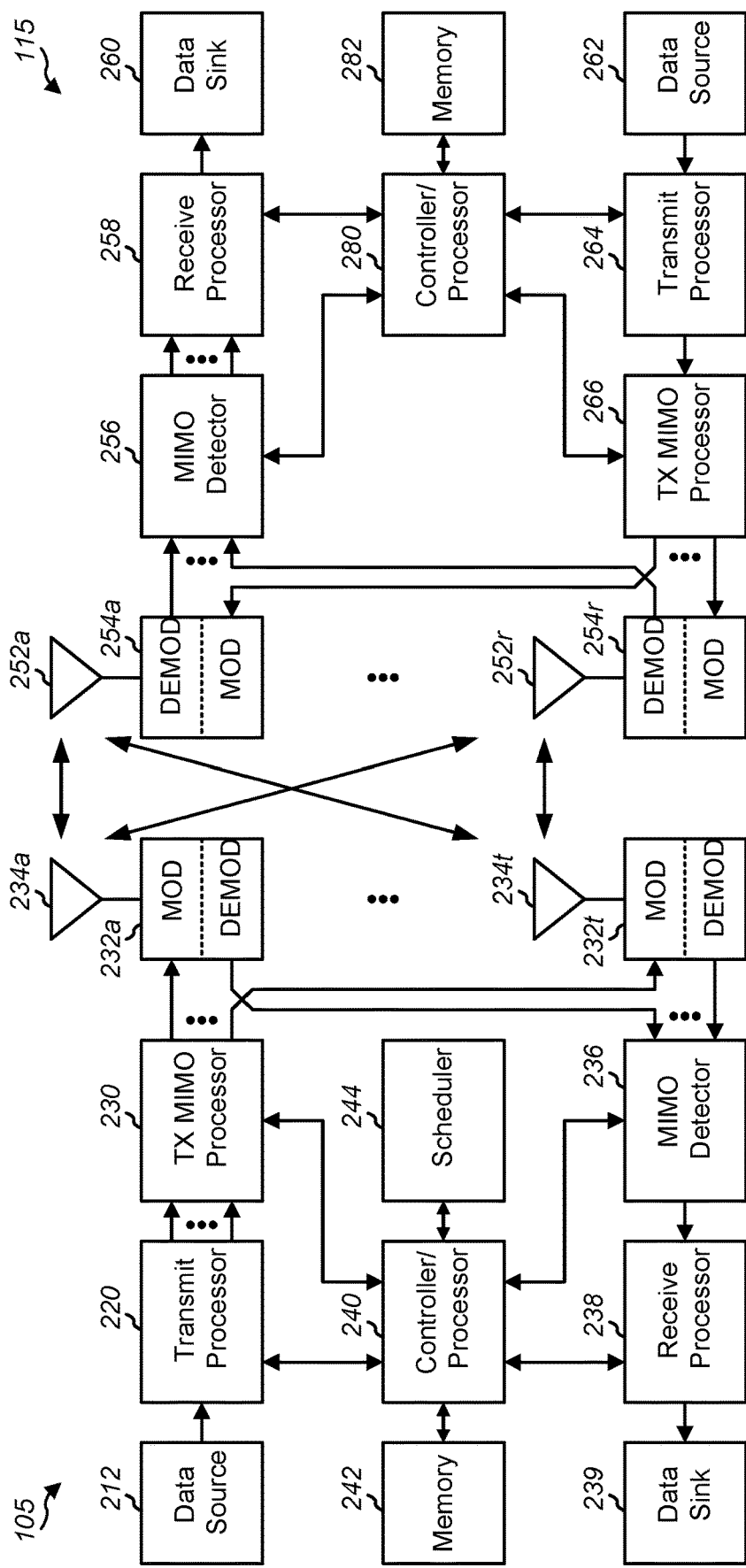
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, 8, 10, and 12, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
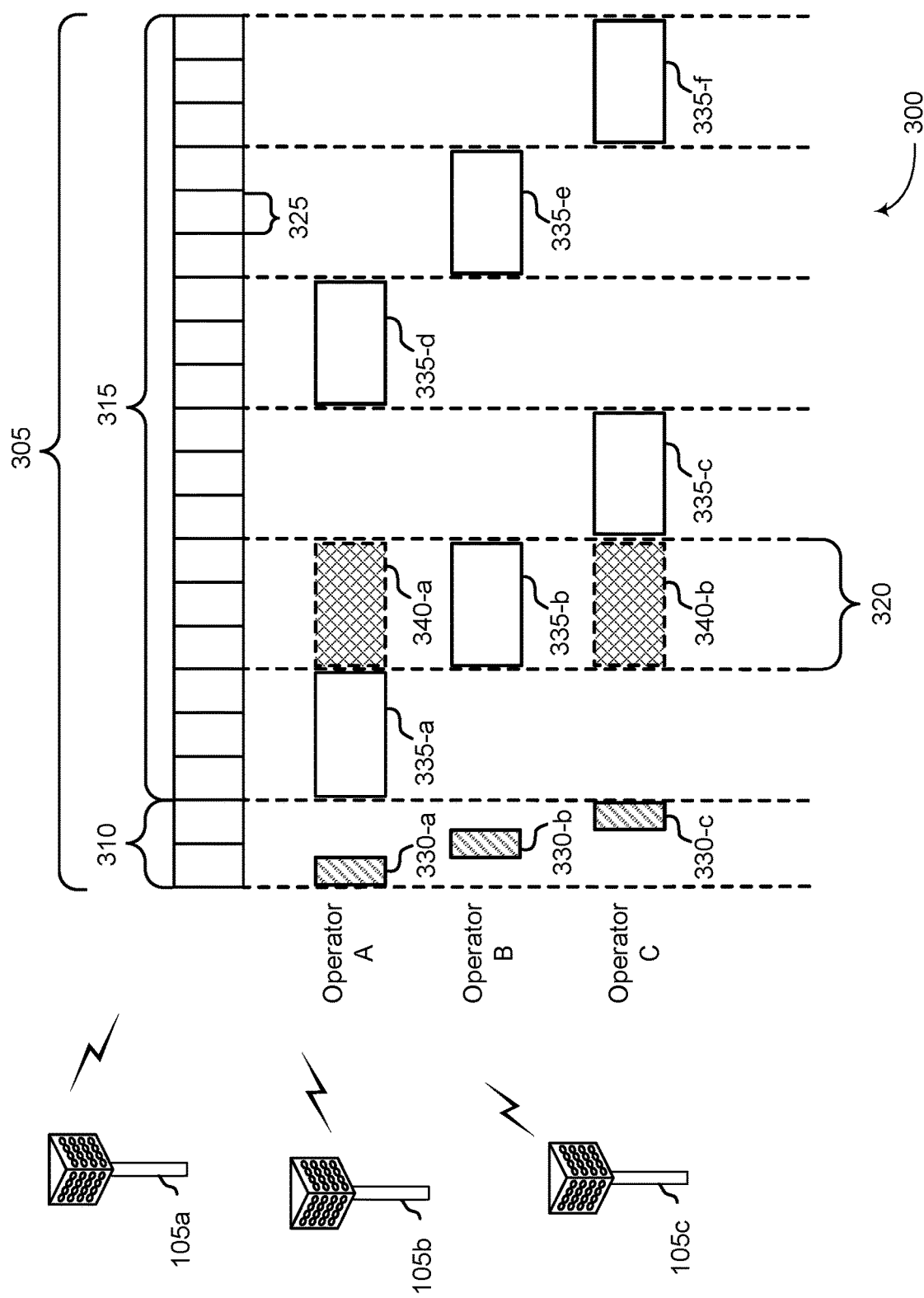
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* may be prioritized for Operator C (e.g., G-INT-OpC), resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator A or Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example, an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In LTE-license assisted access (LAA) and Multefire (MF) access technologies, the defined channel bandwidth is 20 MHz, which may also be the minimum bandwidth at which WiFi contention occurs. However, in NR unlicensed (NR-U) and NR shared spectrum (NR-SS), the bandwidth allocation for transmissions could be larger than 20 MHz and need not be an integer multiple of 20 MHz. For example, a bandwidth part (BWP) configured for a UE could be 25 MHz, 30 MHz, and the like. Thus, there may be a mismatch between the listen before talk (LBT) bandwidth and autonomous uplink (AUL) resource blocks (RBs). The pre-allocated resources for AUL transmissions may provide for a transmission waveform that may be contiguous or interlace-based. With such alternatives, performing LBT in a typical 20 MHz LBT bandwidth may present challenges.

In the traditional LBT procedure, a UE may perform LBT on all 20 MHz channels on which the AUL resources are configured. Thus, for any AUL transmissions that span multiple 20 MHz LBT channels, the UE would perform LBT on each of the 20 MHz channels even though transmissions would only cover portions of those channels. Various aspects of the present disclosure are directed to defining a smaller channel sensing bandwidth.

Figure 4:
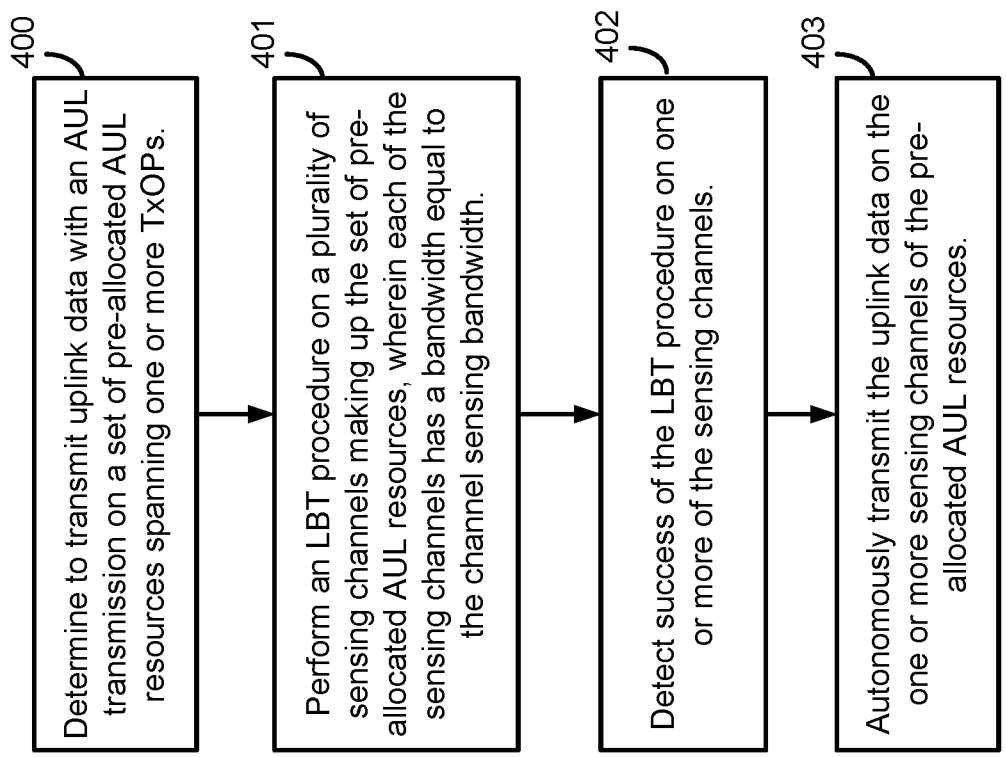
FIG. 4 is a block diagram illustrating example blocks executed to implement one aspect of the present disclosure.
Figure 13:
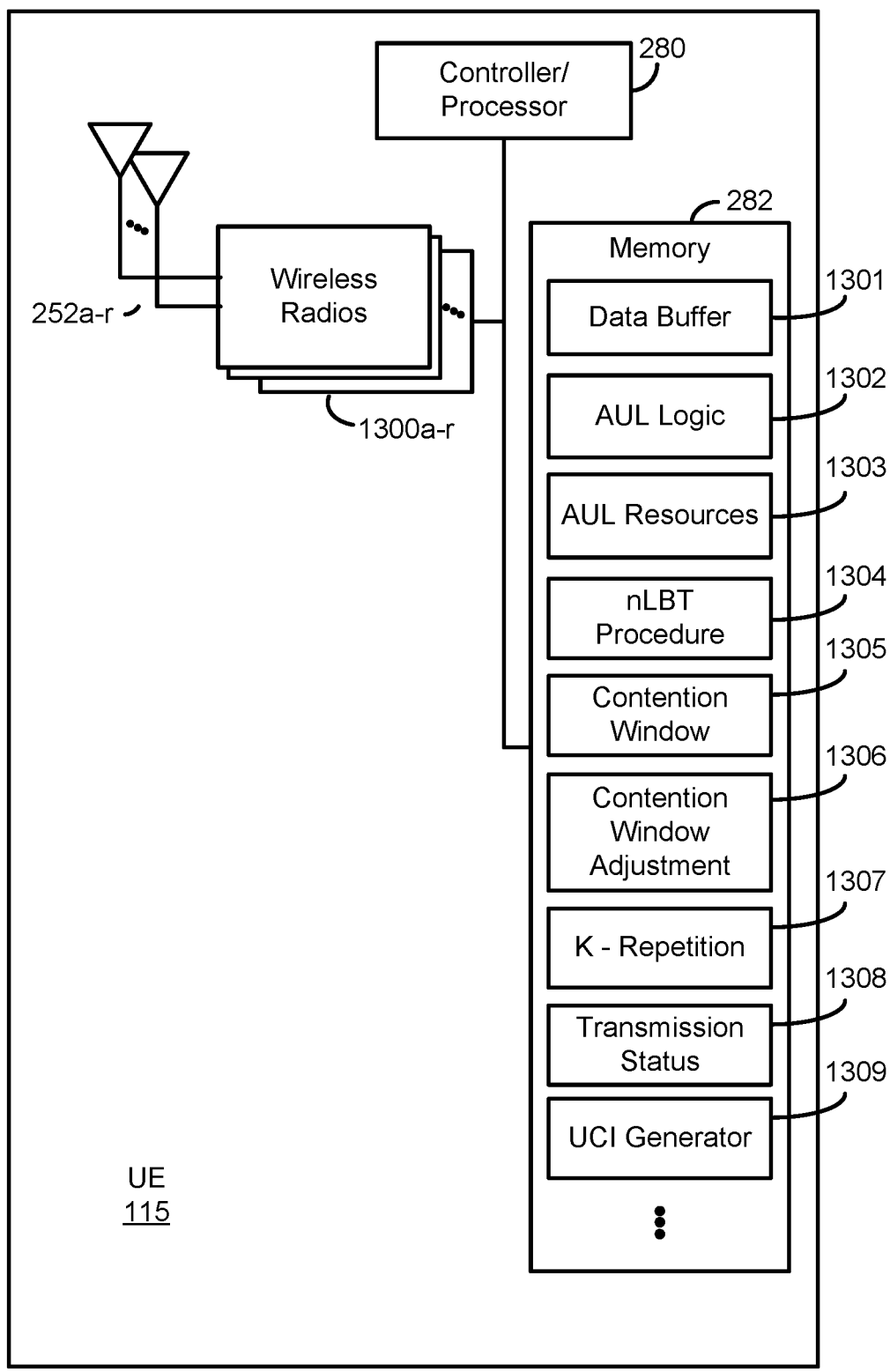
FIG. 13 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300*a-r* and antennas 252*a-r*. Wireless radios 1300*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a UE determines to transmit uplink data with an autonomous uplink (AUL) transmission on a set of pre-allocated AUL resources of shared communication spectrum, wherein the set of pre-allocated AUL resources spans one or more transmission opportunities (TxOPs). For example, UE 115 recognized uplink data in data buffer 1301 in memory 282. Upon recognizing uplink data to be transmitted, UE 115, under control of controller/processor 282 executes AUL logic 1302. The execution environment of AUL logic 1302 provides the functionality for UE 115 to transmit uplink transmissions via wireless radios 1300*a-r* and antennas 252*a-r*. The execution environment of AUL logic 1302 uses the configured AUL transmission resources stored at AUL resources 1303 received at UE 115 via antennas 252*a-r* and wireless radios 1300*a-r* which allocates uplink resources for AUL transmissions.

At block 401, the UE performs an LBT procedure on a plurality of sensing channels making up the set of pre-allocated AUL resources, wherein each of the sensing channels of the plurality of sensing channels has a bandwidth equal to the channel sensing bandwidth. UE 115 also receives via antennas 252*a-r* and wireless radios 1300*a-r* a configuration signal from a serving base station that includes a sensing bandwidth that is smaller than wideband bandwidth for narrow LBT (nLBT) procedures over the pre-allocated AUL transmissions resources. UE 115, under control of controller/processor 282, executes nLBT procedure 1304, stored in memory 282. The execution environment of nLBT procedure 1304 identifies the energy detection threshold associated with the narrow bandwidth of nLBT procedure 1304.

At block 402, the UE detects a success of the LBT procedure on one or more sensing channels of the plurality of sensing channels. Under control of controller/processor 280, UE 115 monitors for energy detected in any transmission on the narrowband sensing channels of the nLBT procedures performing LBT over all of the allocated AUL resources. Where energy readings on the shared spectrum fall within the threshold, UE 115 is allowed to access the spectrum for communications.

At block 403, the UE autonomously transmits the uplink data on the one or more sensing channels of the pre-allocated AUL resources. Within the execution environment of AUL logic 1302, UE 115 may autonomously transmit the data from uplink data buffer 1301 via wireless radios 1300*a-r* and antennas 252*a-r*.

Figure 5:
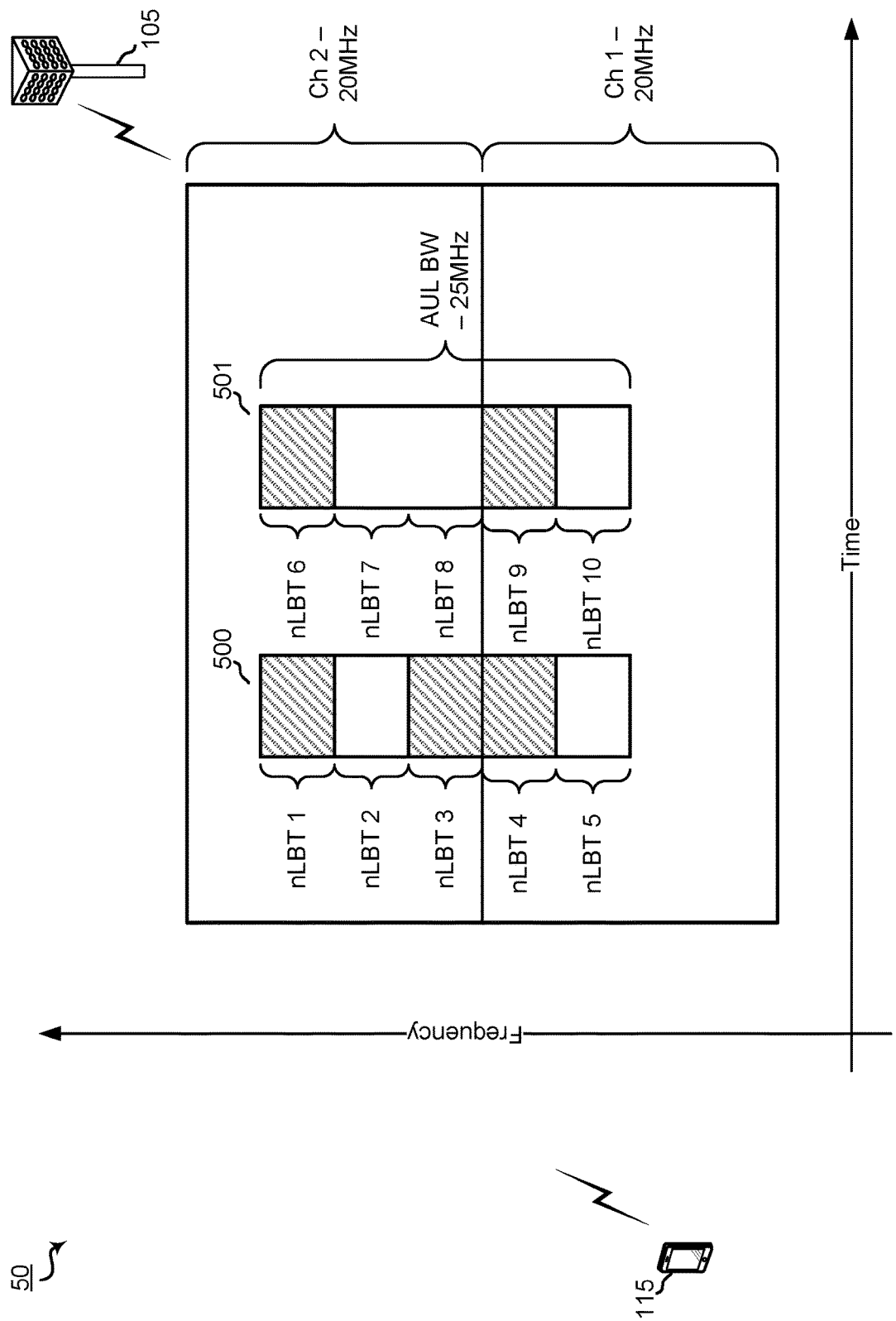
FIG. 5 is a block diagram illustrating an NR-U network with communications between a UE and base station, each configured according to one aspect of the present disclosure.

FIG. 5 is a block diagram illustrating an NR-U network 50 with communications between UE 115 and base station 105, each configured according to one aspect of the present disclosure. The shared communication spectrum for communications between UE 115 and base station 105 includes multiple 20 MHz channels, such as channel 1 (Ch 1) and channel 2 (Ch 2). UE 115 is capable of performing autonomous uplink (AUL) transmission. Base station 105 transmits a configuration signal to UE 115 that configures AUL resources 500 and 501 to UE 115 for AUL transmissions. The configured bandwidth for AUL resources 500 and 501 is 25 MHz. Here, the AUL resources 500 and 501, as allocated, span both Ch 1 and Ch 2.

According to various aspects of the present disclosure, a small sensing bandwidth or narrow LBT (nLBT) procedure may be defined at a smaller channel sensing bandwidth (e.g., 2 MHz, 5 MHz, etc.). The smaller bandwidth of this nLBT procedure may be defined as a fraction of the current 20 MHz LBT bandwidth, which corresponds to the legacy minimum bandwidth for LBT procedures. The fractional bandwidth implementation may be especially useful for contiguous AUL bandwidth allocations and in scenarios where WiFi transmissions are not expected to occur with a high level of confidence. In operation, UE 115 would sense the smaller sensing regions or sub-channels of nLBT 1-10 on which AUL resources 500 and 501 occur. Here, UE 115 detects successful nLBT procedures on nLBT 1, 3, 4, 6, and 9. UE 115 would, thus, transmit AUL transmissions on each such sub-channel corresponding to nLBT 1, 3, 4, 6, and 9 on AUL resources 500 and 501.

It should be noted that the energy detection threshold for an nLBT procedure may be defined on a per MHz of sensing bandwidth and scaled up accordingly. Thus, based on an energy detection threshold rate and the bandwidth of any given nLBT, UE 115 may determine the energy detection threshold for determining the success or failure of an nLBT procedure. Additionally, an extra offset factor may be added to the energy detection threshold to account for the lower sensing accuracy at lower bandwidths.

In contention-based access technologies, such as NR-U and NR-SS, the contention window has traditionally been updated for AUL transmissions independently for each 20 MHz channel. This procedure works well for 5 GHz band transmissions with the WiFi/LAA/MF contention bandwidth granularity of 20 MHz. Various aspects of the present disclosure, when operating with a fractional sensing bandwidth, as described above with respect to FIGS. 4 and 5, provide for all acknowledgement information (e.g., ACK, NACK) to be considered for contention window updates when the transmission is fully contained within a single 20 MHz channel, and a fixed or scalable fraction of acknowledgement information to be considered for contention window update when the transmission spans multiple 20 MHz channels. This contention window updating procedure may apply whether the transmissions are autonomous or scheduled or whether the transmissions are uplink or downlink (e.g., AUL, scheduled uplink (SUL), scheduled downlink (SDL), downlink control information (DCI)-based PUSCH, PDSCH channels, or the like).

Figure 6:
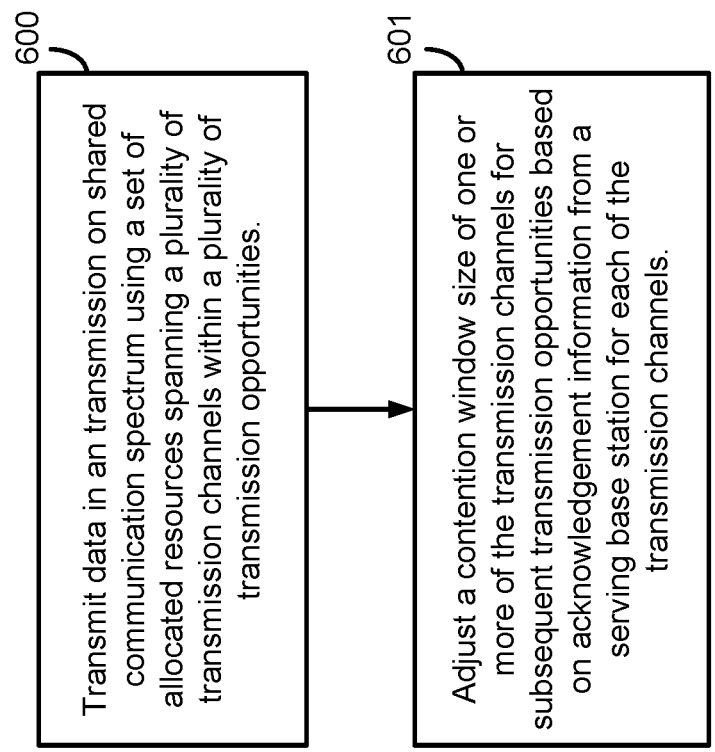
FIG. 6 is a block diagram illustrating example blocks executed to implement one aspect of the present disclosure.
Figure 14:
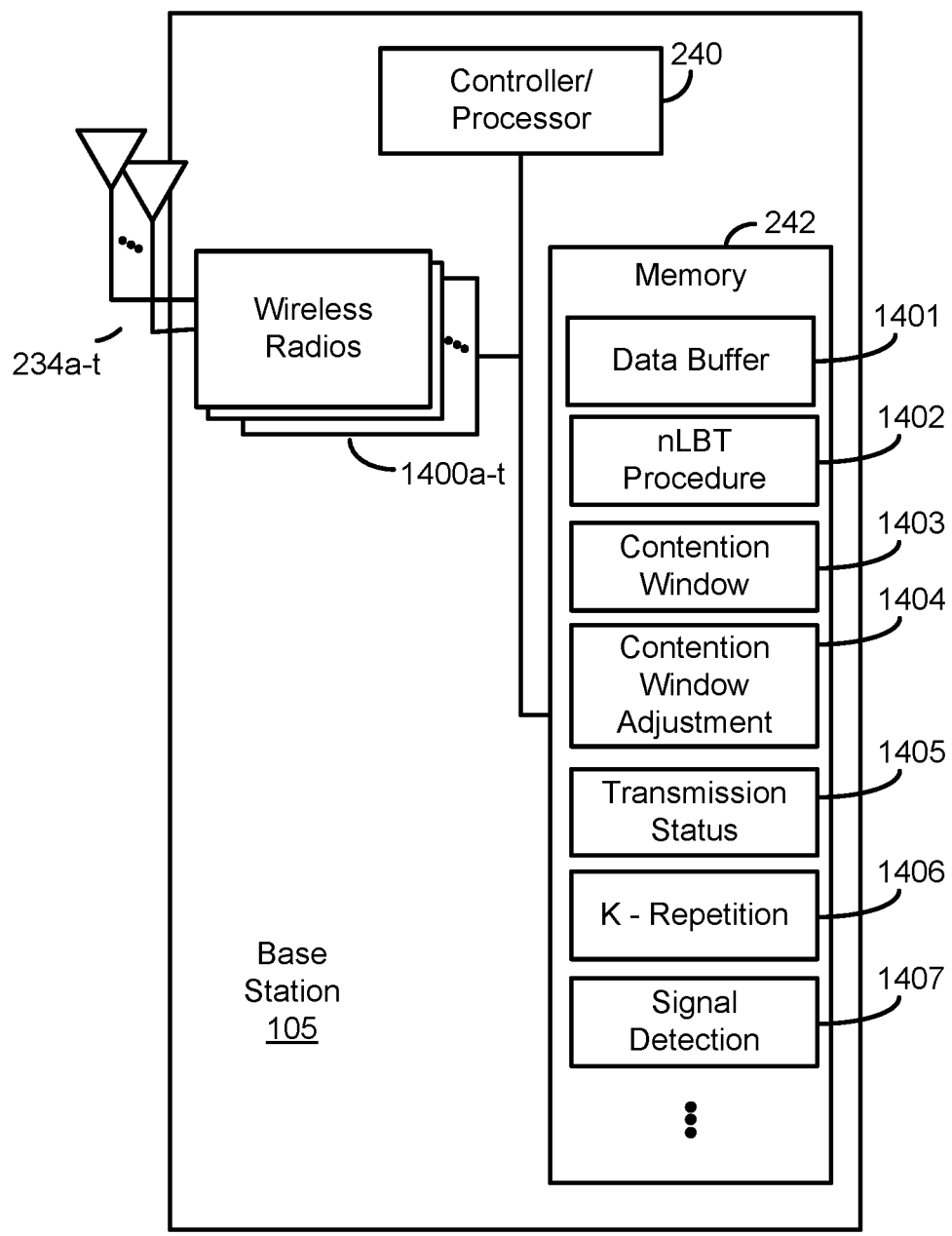
FIG. 14 is a block diagram illustrating an example base station configured according to aspects of the present disclosure.

FIG. 6 is a block diagram illustrating example blocks executed to implement one aspect of the present disclosure. The example blocks will be described with respect to UE 115 as illustrated in FIG. 13. The example blocks will also be described with respect to base station 105 as illustrated in FIG. 14. FIG. 14 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1400a-t and antennas 234a-t. Wireless radios 1400a-t includes various components and hardware, as illustrated in FIG. 2 for base station 105, including modulator/demodulators 232a-t, MIMO detector 236, receive processor 238, transmit processor 220, and TX MIMO processor 230.

At block 600, a transmitter transmits data in a transmission on shared communication spectrum using a set of allocated resources spanning one or more transmission channels within one or more transmission opportunities. In an aspect where UE 115 is the transmitter, UE 115 may recognize uplink data for transmission in data buffer 1301 in memory 282, and transmits the data via wireless radios 1300a-r and antennas 252a-r. UE 115 may use pre-allocated or pre-configured transmission resources, such as AUL resources 1303 for the transmission. In some scenarios, the pre-configured transmission resources or transmissions are fully contained within a single channel (e.g., a single 20 MHz channel). Other scenarios may reflect the pre-configured transmission resources and resulting transmissions spanning multiple channels across one or more transmission opportunities. Each transmission may first require the transmitter to perform an LBT procedure. According to the various aspects of the present disclosure, transmitter—UE 115 and transmitter—base station 105 may perform a narrow bandwidth LBT procedure by executing, under control of controller/processor 280 and 240, respectively, nLBT procedure 1304 and nLBT procedure 1402.

In an aspect where base station 105 is the transmitter, base station 105 may recognize downlink data for transmission stored at data buffer 1401 in memory 242. Base station 105 may use pre-allocated or pre-configured transmission resources to transmit the data stored at data buffer 1401. Similarly, some scenarios may find that the pre-configured transmission resources or transmissions are fully contained within a single channel (e.g., a single 20 MHz channel), while other scenarios may reflect the pre-configured transmission resources and resulting transmissions spanning multiple channels across one or more transmission opportunities. Each such transmission from base station 105 may first require base station 105 to perform an LBT procedure. Thus, base station 105 may perform a narrow bandwidth LBT procedure by executing, under control of controller/processor 240, nLBT procedure 1402.

At block 601, the transmitter adjusts a contention window size of one or more of the transmission channels for subsequent transmission opportunities based on acknowledgement information from a serving base station for each of the transmission channels on which transmit data has been transmitted. For example, in the scenario where UE 115 is the transmitter and the pre-configured transmission resources are fully contained within a single channel, the negative acknowledgement (NACK) rate (e.g., the rate of NACK to acknowledgement (ACK) feedback for the transmissions) for all of the transmissions may be considered when updating the contention window. UE 115 would receive the acknowledgement information from the receiver node via antennas 252a-r and wireless radios 1300a-r and store at transmission status 1308, in memory 282. Otherwise, where the transmission resources and transmissions span multiple channels of one or more transmission opportunities, a fixed or scalable fraction of the acknowledgement information, the ACK and NACK information, for the corresponding channel may be used by UE 115 for contention window updates. Here, UE 115 would, under control of controller/processor 280, execute contention window adjustment logic 1306 to update the contention window value at contention window 1305 using the acknowledgement information from transmission status 1308.

In the scenario where base station 105 is the transmitter and the pre-configured transmission resources are fully contained within a single channel, the NACK rate for all of the transmissions may be considered when updating the contention window. Here, base station 105 would receive the acknowledgement information from the receiver node via antennas 234a-t and wireless radios 1400a-t and store at transmission status 1405, in memory 242. Base station 105 would, under control of controller/processor 280, execute contention window adjustment logic 1404 to update the contention window value at contention window 1403 using the acknowledgement information from transmission status 1405.

Figure 7:
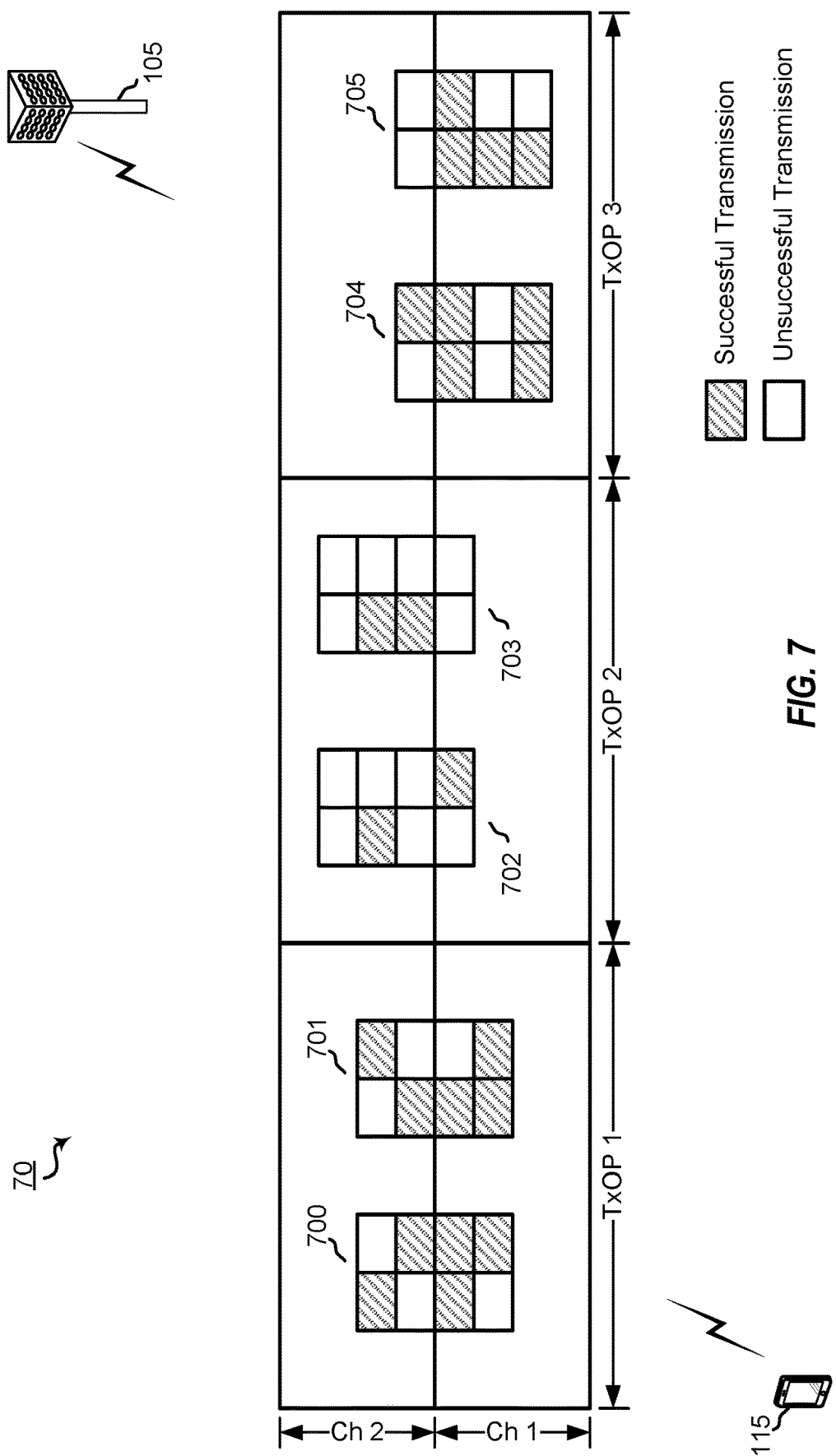
FIG. 7 is a block diagram illustrating a NR-U network having a UE and base station, each configured according to one aspect of the present disclosure.

FIG. 7 is a block diagram illustrating NR-U network 70 having UE 115 and base station 105, each configured according to one aspect of the present disclosure. The bandwidth part allocated for shared communication spectrum includes two channels (Ch 1 and Ch 2), each of which 20 MHz in bandwidth. In one example operation, as illustrated in FIG. 7, a transmission is configured with transmit resources 700-705, each of which includes resource blocks over 10 MHz that span both channels. The example aspects illustrated in FIG. 7 may be applicable for AUL transmissions, SUL transmissions, and downlink transmissions as well. In describing the various optional aspects of FIG. 7, the transmitter may be identified as UE 115 for uplink transmissions or base station 105 for downlink transmissions, while the receiver may be the receiving node, either base station 105 in uplink transmissions or UE 115 in downlink transmissions.

In a first optional implementation illustrated in FIG. 7, the contention window may be updated on both channels, Ch 1 and Ch 2, assuming full acknowledgement information for both channels. Thus, as transmissions are made by UE 115 or base station 105, some transmissions on transmit resources 700-705 will be successful and some unsuccessful, either because the transmitter detected an unsuccessful nLBT over a particular sub-channel or because the receiver was unable to successfully decode the transmission. The receiver (either UE 115 or base station 105) will transmit acknowledgement information indicating ACKs for successful transmissions and NACKs for unsuccessful transmissions. A NACK rate will be determined based on a ratio or relationship of NACKs to attempted transmissions or to ACKs. If the NACK rate exceeds a predetermined threshold, the contention window for the subsequent transmission opportunity may be increased in Ch 1 and Ch 2, up to a maximum length of time. Otherwise, if the NACK rate remains within the predetermined threshold, the contention window may either remain the same or be reduced in Ch 1 and Ch 2, down to a minimum length of time. The transmitter would gather all of the acknowledgement information for the transmissions over TxOPs 1-3 in order to calculated the NACK rate and determine any update to the contention window of Ch 1 and Ch 2 for the subsequent TxOP (not shown) after TxOP 3.

In a second optional implementation illustrated in FIG. 7, the contention window may be updated on both channels but by using a portion of the acknowledgement information that contributes to the transmission portion of each of Ch 1 and Ch 2. The NACK rate for each channel will contribute at a weight of 1/N (where N=number of channels used). For example, where a transmission spans two transmission opportunities (TxOP 1 and TxOP 2), and the contention window value is 15 for TxOP 1, in TxOP 2, as the transmitter would not have received any downlink feedback indication (DFI) from the TxOP 1 transmissions, the contention window for TxOP 2 would remain 15. The transmitter would eventually receive the AUL-DFI indicating the acknowledgement information and success/failure indication for both TxOPs.

As illustrated, in TxOP 1, Ch 1 has experienced two NACKs to six ACKs for a NACK rate of 0.33, while Ch 2 has experienced four NACKs to four ACKs for a NACK rate of 1.0. With two channels used, each NACK rate contributes 50% of the combined NACK rate for contention window update consideration. Thus, the combined NACK rate for TxOP 1 would be approximately 0.665 (0.33/2+1.0/2). UE 115 may round up or down, as configured. For TxOP 2, Ch 1 experiences three NACKs to one ACK for a NACK rate of 3.0, while Ch 2 experiences nine NACKs to three ACKs for a NACK rate of 3.0. Again, as each channel contributes 50% of the combined NACK rate for TxOP 2, the combined NACK rate would be approximately 3.0

In determining the contention window update for TxOP 3, the transmitter may determine a composite number to represent the NACK rates of TxOP 1 and TxOP 2, by which to increase the contention window size. For example, the composite may be calculated by adding the two NACK rates of TxOP 1 and TxOP 2 (0.665+3.0=3.665) and increasing the contention window for TxOP 3 by the composite amount. Thus, 3.669*15=54.975~ rounded to 54. If 54 were to exceed the maximum contention window size, the contention window for TxOP 3 would be capped at the maximum size value. This composite number may be referred to as a composite adjustment number. The transmitter may round or set to a floor or ceiling value for the composite contention window size before arriving at the final contention window adjustment for TxOP 3.

In a third optional aspect illustrated by FIG. 7, the contention window may be updated for both channels, but using the acknowledgement information contributing a weight that is proportional to the ratio of resource blocks in each channel. In TxOP 1, 50% of the resource blocks are in Ch 1 and 50% of the resource blocks are in Ch 2. Thus, the NACK rate for each channel contributes 50% of the acknowledgement information for TxOP 1. Similarly, in TxOP 2, 25% of the resource blocks are in Ch 1 and 75% of the resource blocks are in Ch. 2. Thus, the NACK rate for each channel will contribute acknowledgement information at different rates for TxOP 2 for considering a contention window update.

In a fourth optional aspect illustrated by FIG. 7, the transmitter can select one of Ch 1 or Ch 2 as the primary channel (either picking semi-statically or dynamically) and then update the contention window only on that primary channel. The selection of primary channel may occur semi-statically or dynamically every TxOP. Various considerations may be applied for determining which of the channels is the primary channel. For example, the channel having the most transmit resource blocks may be selected as the primary channel, such as the transmitter selecting Ch 2 as the primary channel in TxOP 2 based on the majority of resource blocks for transmission being located in Ch 2. Alternatively, the channel having the least interference may be selected as the primary channel, such as the transmitter selecting Ch 1 as the primary channel in TxOP 1, as measurements or signals from the receiver indicate that Ch 1 experiences less interference than Ch 2. Once selected as the primary channel, then the contention window may be updated on the primary channel based on acknowledgement information either only for the primary channel or based on all acknowledgement information received for all transmissions over both channels.

In NR for configured uplink grants (e.g., Type 1 & Type 2 PUSCH transmission), a repetition factor, K, can be configured, such that a UE can transmit up to K repetitions of the same transport block (TB) contingent upon various early termination conditions. Termination conditions may include simply providing for transmission of all K repetitions, terminating repetition transmissions at the last transmission occasion of the K repetitions within a period, P, or terminating repetition transmissions once an uplink grant for the same TB is received within the period, P. Such NR-U K-repetition procedures can be configured for UE AUL transmissions. Various additional aspects of the present disclosure are directed to considering contention window update procedure for NR-U AUL transmissions repeated over K repetitions.

Figure 8:
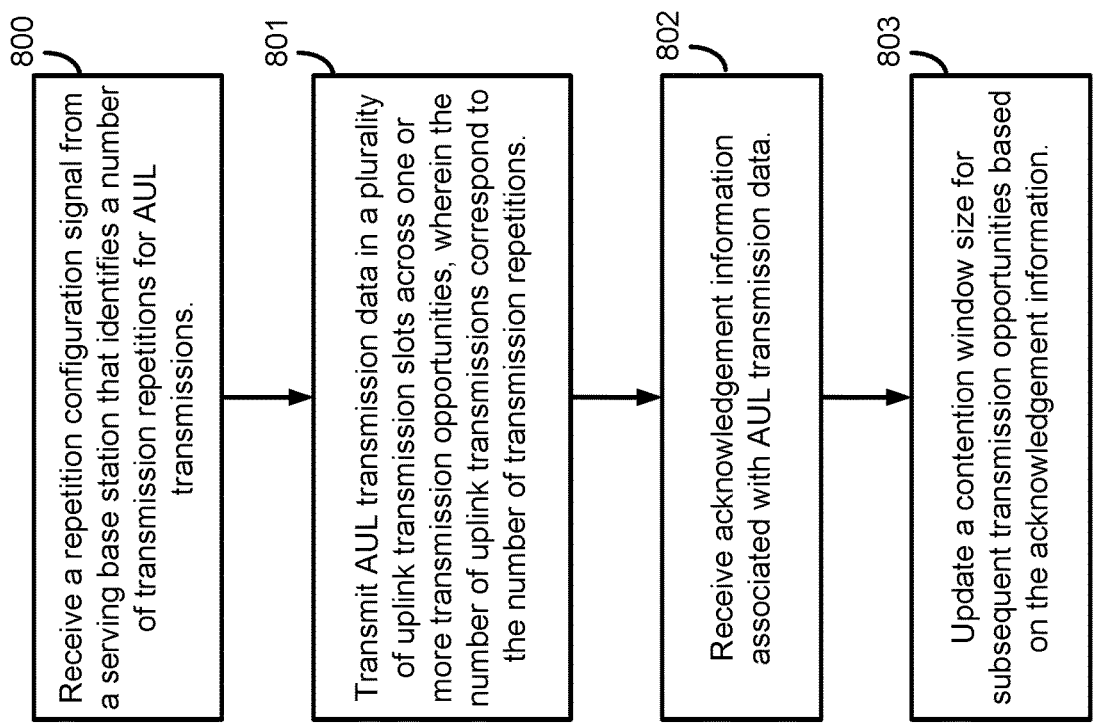
FIG. 8 is a block diagram illustrating example blocks executed to implement one aspect of the present disclosure.

FIG. 8 is a block diagram illustrating example blocks executed to implement one aspect of the present disclosure. The example blocks will be described with respect to UE 115 as illustrated in FIGS. 2 and 13.

At block 800, a UE receives a repetition configuration signal from a serving base station identifying a number of transmission repetitions for AUL transmissions. For example, UE 115 receives a repetition configuration signal from a serving base station via antennas 234*a-t* and wireless radios 1400*a-t*. The repetition configuration signal populates the K-repetition value at K-repetition 1307, in memory 282.

At block 801, the UE transmits AUL transmission data in a plurality of uplink transmission slots across one or more transmission opportunities of a shared communication spectrum, wherein the number of uplink transmissions correspond to the number of transmission repetitions. For example, the UE 115 uses the data from data buffer 1301 to transmit in AUL transmissions. UE 115, under control of controller/processor 280, executes AUL logic 1302, in memory 282. The execution environment of AUL logic 1302, pulls the resources for AUL transmission from AUL resources 1303 and then autonomously transmit the data via wireless radios 1300*a-r* and antennas 252*a-r*.

At block 802, the UE receives acknowledgement information associated with AUL transmission data. After transmitting the AUL transmission data on the pre-configured AUL resources, UE 115 receives acknowledgement information from its serving base station as to the success or failure of any decoding or receipt of the AUL transmissions. The acknowledgement information is received via antennas 252*a-r* and wireless radios 1300*a-r*.

At block 803, the UE updates a contention window size for subsequent transmission opportunities based on the acknowledgement information. After obtaining the acknowledgement information, UE 115, under control of controller/processor 280, executes contention window adjustment logic 1306, stored in memory 282. The execution environment of contention window adjustment logic 1306 calculates a NACK rate of the acknowledgement information for the transmission repetitions and compares the NACK rate against a predetermined threshold. According to the various aspects of the present disclosure, the execution environment of contention window adjustment logic 1306 uses different methods for determining the NACK rate and final contention window adjustment. When all K repetitions are within the same TxOP, UE 115 may consider updates to the contention window after the last transmission using the acknowledgement information for all of the K repetitions. Otherwise, when the K repetitions are spread across or across and outside of multiple TxOPs, UE 115 may update each TxOP using the acknowledgement information for the AUL repetitions within that TxOP or may not update the contention window until after all K repetitions have been transmitted and acknowledgement information received. In such cases, the contention window for the initial TxOPs that occur prior to the final AUL transmission repetition may either remain fixed or may be scaled by a scaling factor, which may be fixed or associated with a factor of the network.

Figure 9A:
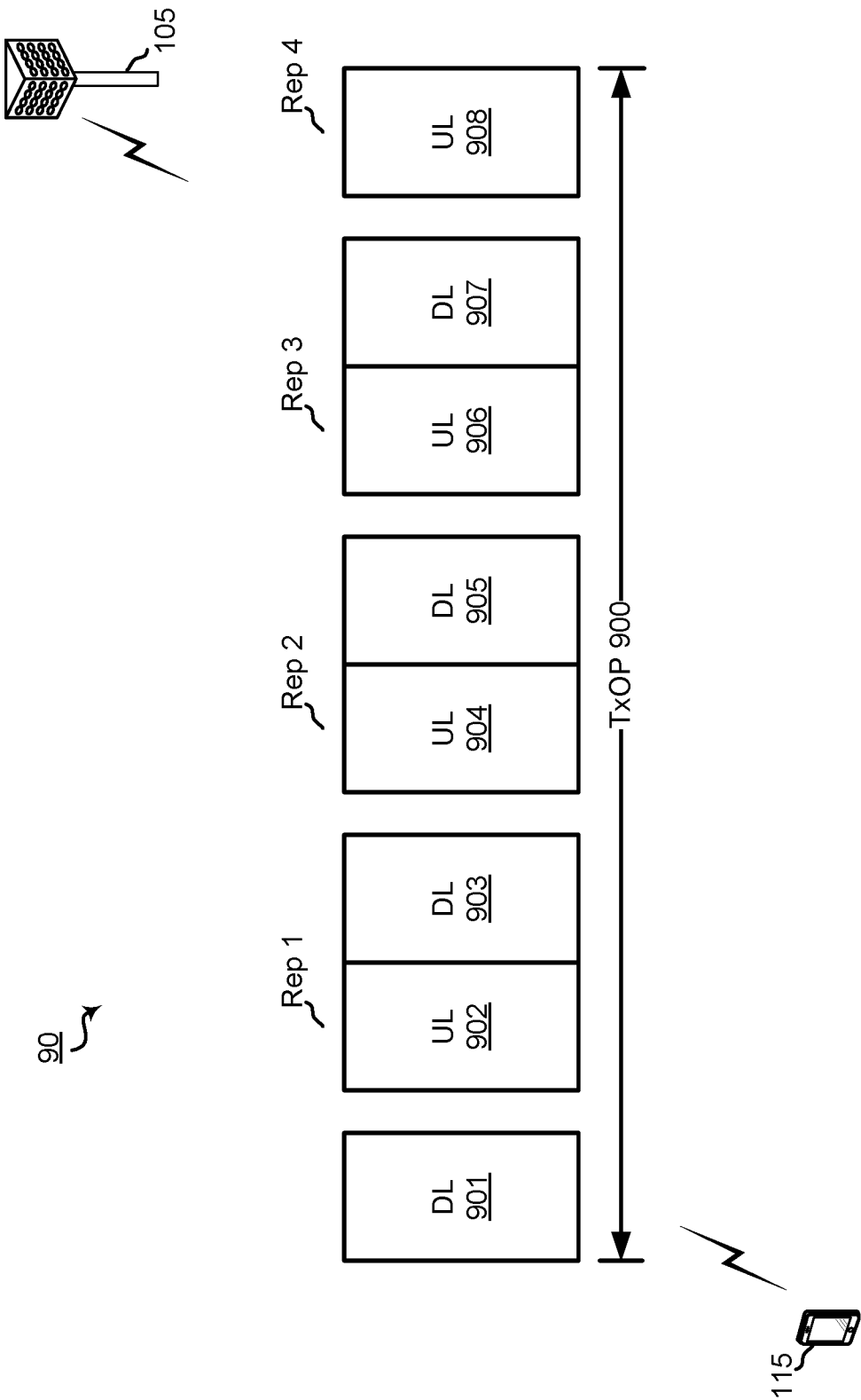
FIGS. 9A-9C are block diagrams illustrating a NR-U network with a UE and base station, each configured according to one aspect of the present disclosure.

FIG. 9A is a block diagram illustrating NR-U network 90 with UE 115 and base station 105, each configured according to one aspect of the present disclosure. In a first scenario for AUL transmissions transmitted at K repetitions, all K repetitions may be within the same TxOP, TxOP 900. Base station 105 has signaled a configuration message to UE 115 identifying, among other things, AUL resources for uplink transmissions 902, 904, 906, and 908, and a repetition factor, K=4. In such an aspect, the reference transmission for the contention window update may be the last transmission, repetition 4-uplink transmission 908, within TxOP 900. Base station 105 would update the contention window after combining all of acknowledgement information on uplink transmissions 902, 904, 906, and 908 of the K-repetitions. Base station 105 can update UE 115 on the status (success/failure) of AUL transmissions, uplink transmissions 902, 904, 906, and 908 within the downlink portions, downlink transmissions 903, 905, and 907 of TxOP 900 in between two uplink portions designated for AUL transmissions, uplink transmissions 902, 904, 906. Depending on the common PDCCH (CPDCCH)/slot format indicator (SFI) indication, some repetitions may be subject to an abbreviated 25 μs or category 2 LBT procedure and some repetitions may be transmitted without LBT.

It should be noted that, in practice, a repetition factor of K=2 or K=4 may be applicable for sub-6 GHz communications, while K=8 may be applicable for mmW transmissions above 6 GHz due to processing timeline considerations.

Figure 9B:
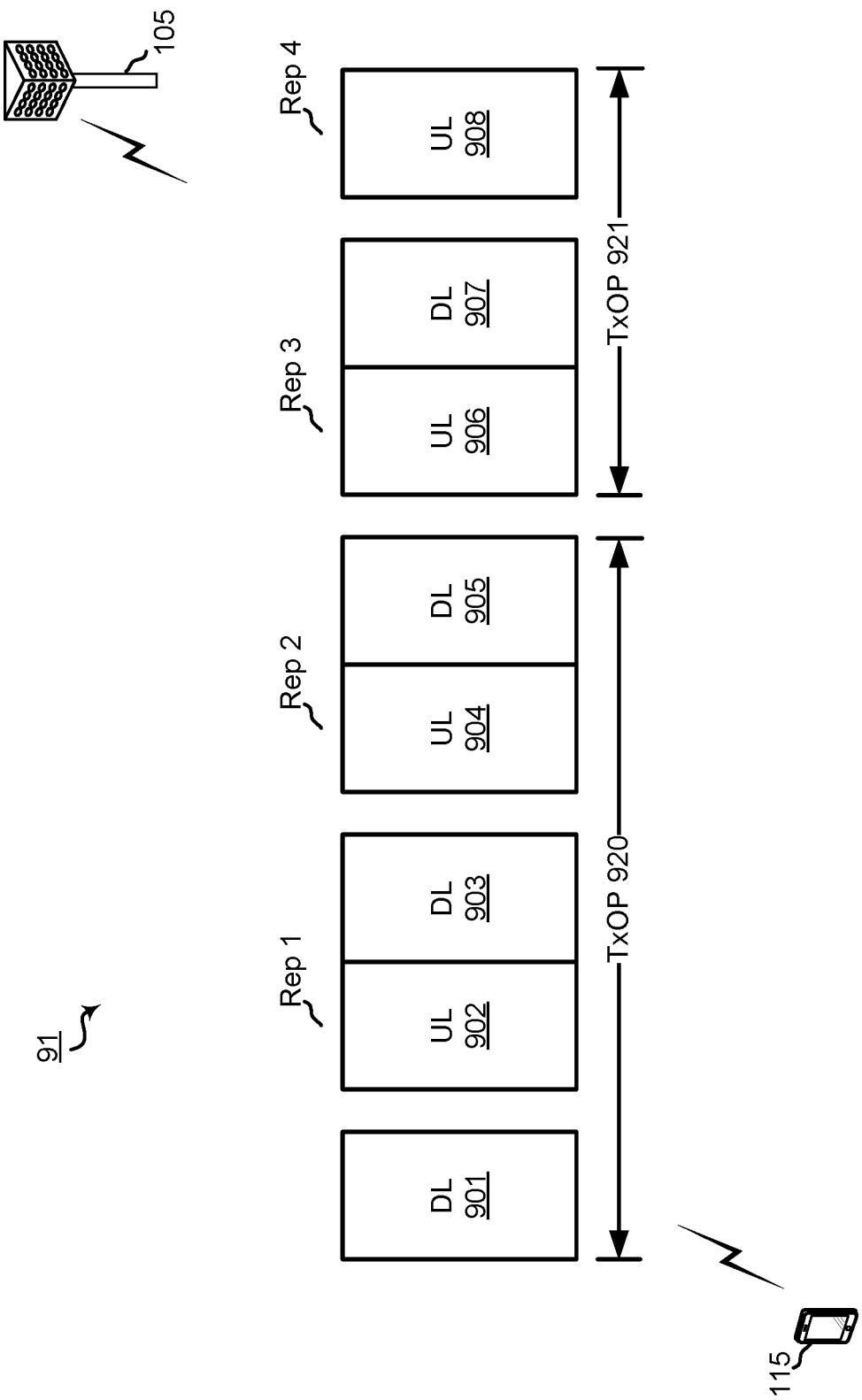

FIG. 9B is a block diagram illustrating NR-U network 91 with UE 115 and base station 105, each configured according to one aspect of the present disclosure. In a second scenario of AUL transmissions transmitted at K repetitions, some repetitions may be within a TxOP, while others in a different TxOP. In aspects where repetitions are transmitted across different TxOPs, a first case may provide for all repetitions to be split between multiple TxOPs, while in a second case, some repetitions may be located within multiple TxOPs of base station 105 and some repetitions are outside of the TxOPs of base station 105. In a third case, all repetitions may be located outside of the TxOPs of base station 105. In a first optional aspect of the present disclosure according to any of the various cases of splitting the repetitions, the contention window may be updated by taking into account only the repetitions from that TxOP, such that a new contention window value is generated for each new TxOP based on combining repetitions within the corresponding TxOP.

For example, in TxOP 920, two repetitions (Rep 1 & 2) of AUL transmissions at uplink transmission 902 and 904 are transmitted, the acknowledgement information may be received from base station 105 through DFI signals received at downlink transmissions 903 and 905. In determining a contention window update for TxOP 921, UE 115 considers the acknowledgement information for Rep 1 and Rep 2. In TxOP 921, with the updated contention window, UE 115 transmits AUL transmissions for Rep 3 and Rep 4 at uplink transmissions 906 and 908. UE 115 will determine the contention window update for the following TxOP (not shown) based on the acknowledgement information received from base station 105 associated with the Rep 3 and Rep 4 AUL transmissions.

It should be noted that currently there is generally no ACK/NACK signaling in between repetition transmissions. Thus, according to the presently described aspect, the AUL-DFI transmitted from base station 105 would include information on the success or failure of any intermediate decoding of the AUL transmission repetitions.

Figure 9C:
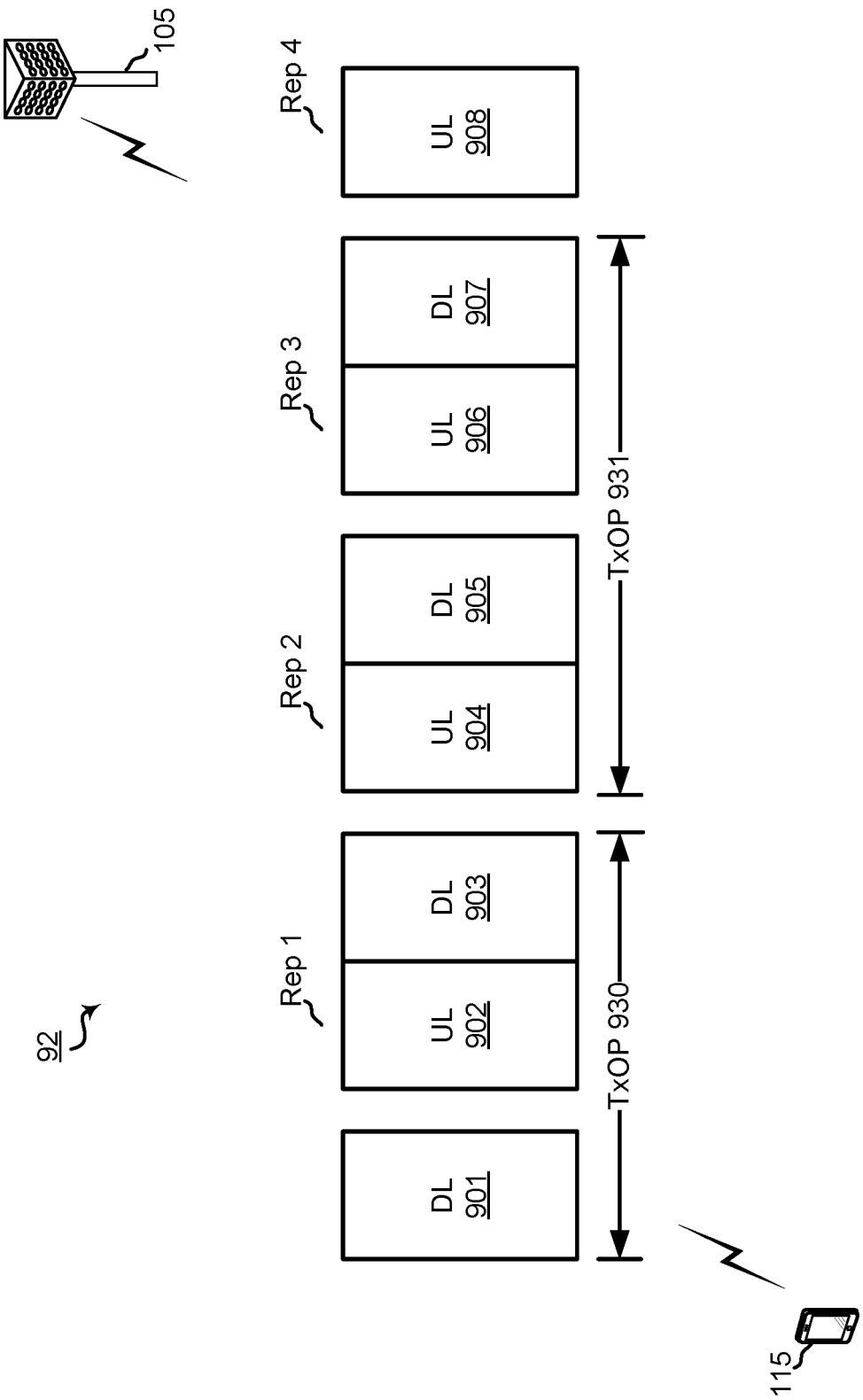

FIG. 9C is a block diagram illustrating NR-U network 92 with UE 115 and base station 105, each configured according to one aspect of the present disclosure. Base station 105 configures multiple AUL resources across TxOP 930 and 931, in addition to resources outside of TxOPs 930 and 931. Base station 105 further configures K=4 for repetition of AUL transmissions. According to the illustrated aspect of the present disclosure, UE 115 may update the contention window at the end of all the repetitions, even where the repetition transmissions are spread across multiple downlink and uplink TxOPs. In a first alternative of such aspect, the contention window for a new TxOP which carries some of the repetitions may be frozen, such that the information about any grant-free transmission is not used to update the contention window size. For example, in TxOP 930, a contention window may be a value of 15. Before receiving any acknowledgement information on the AUL transmission of Rep 1 at uplink transmission 902, UE 115 determines to main the contention window for TxOP 931 at 15. Only until the transmission of Rep 4 at uplink transmission 908 would UE 115 combine the acknowledgement information for all of the repetitions for considering contention window updates for subsequent TxOPs.

In a second alternative of such aspect illustrated in FIG. 9C, the contention window for each new TxOP which carries some of the repetitions may be scaled by a fixed amount, which can be configured by the base station. For example, in TxOP 930, with Rep 1 of the AUL transmission at uplink transmission 902, the contention window is 15. In TxOP 931, which includes Rep 2 and Rep 3 of the AUL transmissions at uplink transmissions 904 and 906, UE 115 may increase the contention window to 30 (with a scale factor=2). Once all the repetitions are transmitted at Rep 4 of uplink transmission 908, UE 115 may determine the actual contention window update to be performed.

The configuration of AUL in LAA and MF networks provides for uplink control information (UCI) that may be transmitted in each AUL transmission to enable the base station to decode the transmissions from the UE. This UCI carries the UE identifier (ID), hybrid automatic repeat request (HARQ) ID, redundancy version (RV), new data indicator (NDI), etc. Various aspects of the present disclosure are directed to handling of UCI transmission in NR-U networks configured for K-repetition based AUL transmissions.

Figure 10:
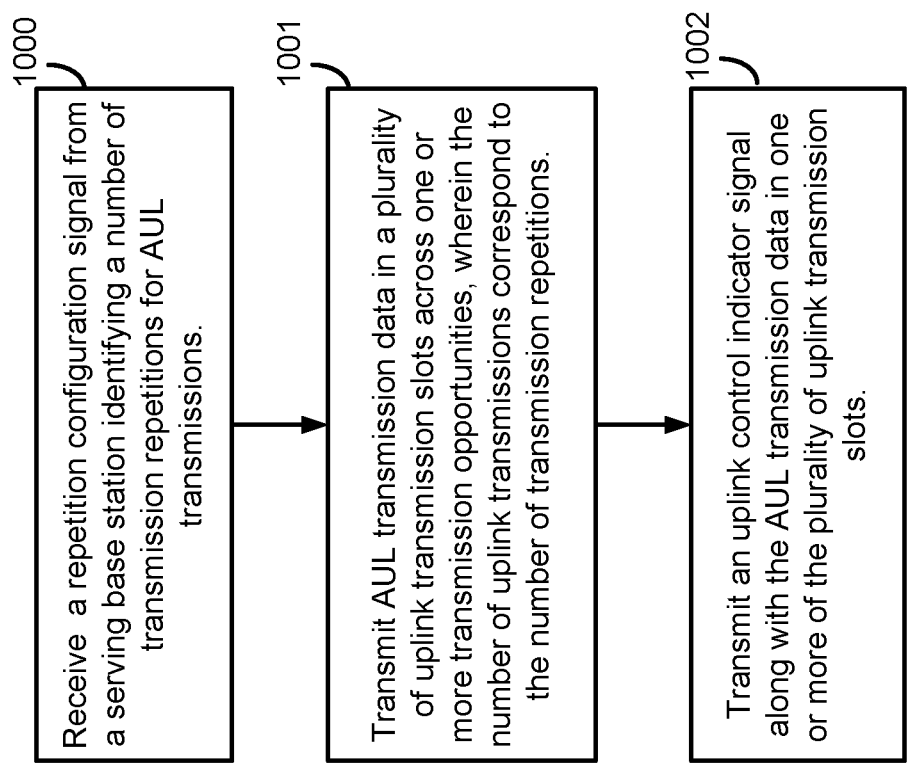
FIG. 10 is a block diagram illustrating example blocks executed by a UE to implement one aspect of the present disclosure.

FIG. 10 is a block diagram illustrating example blocks executed by a UE to implement one aspect of the present disclosure. The example blocks will be described with respect to UE 115 as illustrated in FIG. 13.

At block 1000, a UE receives a repetition configuration signal from a serving base station, wherein the repetition configuration signal identifies a number of transmission repetitions for AUL transmissions. For example, UE 115 receives a repetition configuration signal from a serving base station via antennas 234a-t and wireless radios 1400a-t. The repetition configuration signal populates the K-repetition value at K-repetition 1307, in memory 282.

At block 1001, the UE transmits AUL transmission data in a plurality of uplink transmission slots across one or more transmission opportunities of a shared communication spectrum, wherein the number of uplink transmissions correspond to the number of transmission repetitions. For example, the UE 115 uses the data from data buffer 1301 to transmit in AUL transmissions. UE 115, under control of controller/processor 280, executes AUL logic 1302, in memory 282. The execution environment of AUL logic 1302, pulls the resources for the AUL transmission from AUL resources 1303 and then autonomously transmits the data via wireless radios 1300a-r and antennas 252a-r according to the number of repetitions at K-repetition 1307.

At block 1002, the UE transmits an uplink control indicator signal along with the AUL transmission data in one or more of the uplink transmission slots. In addition to the uplink data for the AUL transmissions, UE 115 will transmit a UCI signal. Within the execution environment of AUL logic 1302, UE 115, under control of controller/processor 280, executes UCI generator 1309. The execution environment of UCI generator 1309 creates the UCI signal including UE ID, HARQ ID, RV, NDI, and the like. The generated UCI signal is added to one or more of the AUL transmissions via wireless radios 1300a-r and antennas 252a-r.

Figure 11:
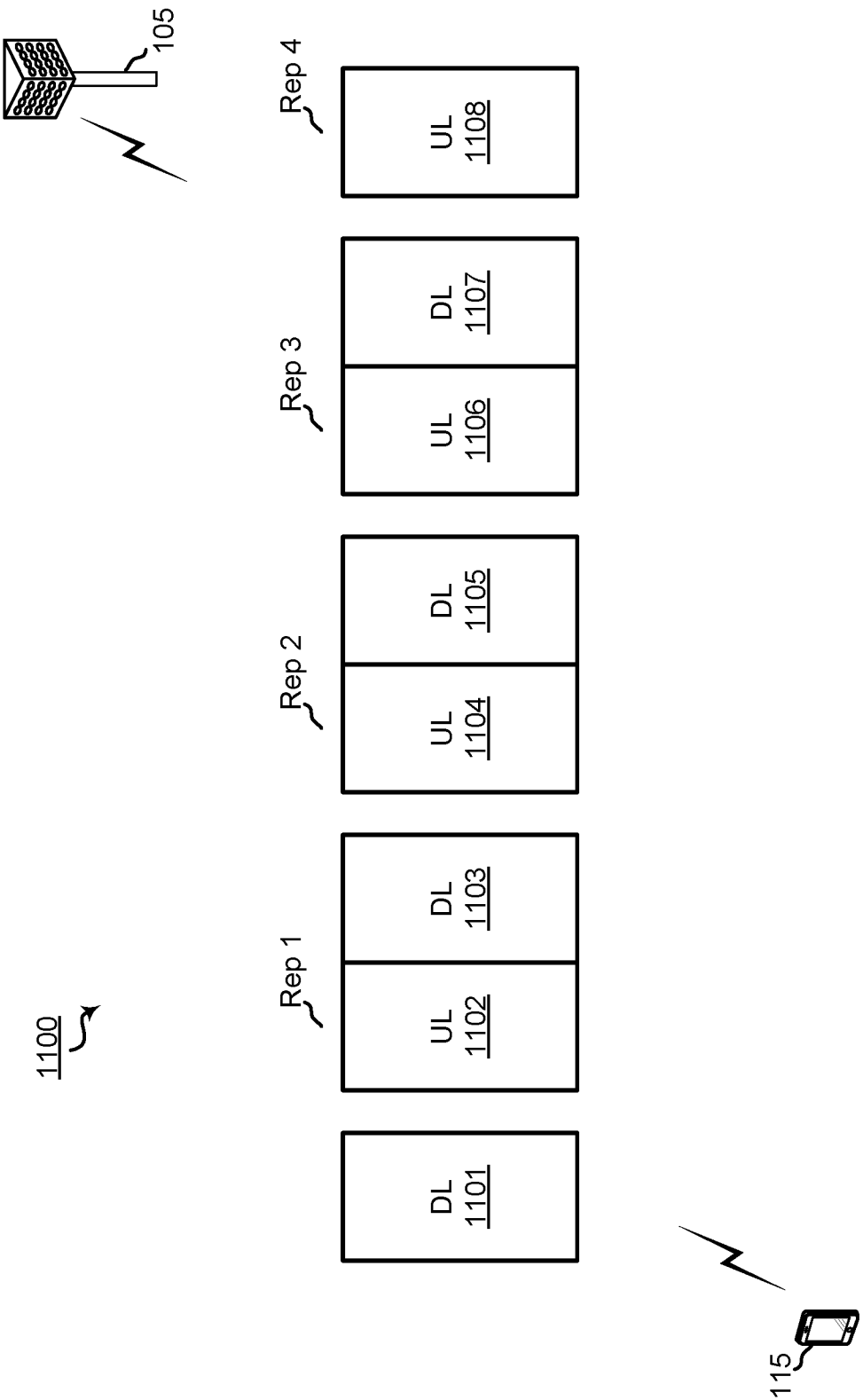
FIG. 11 is a block diagram illustrating a NR-U network with a UE and base station, each configured according to one aspect of the present disclosure.

FIG. 11 is a block diagram illustrating NR-U network 1100 with UE 115 and base station 105, each configured according to one aspect of the present disclosure. Base station 105 configures multiple AUL resources at uplink transmissions 1102, 1104, 1106, and 1108. Base station 105 further configures K=4 for repetition of AUL transmissions. In a first optional implementation of the illustrated aspect, UE 115 includes a UCI to be carried with the AUL transmissions in each of the repetitions, Rep 1-4, at uplink transmissions 1102, 1104, 1106, and 1108. Thus, should base station 105 fail to decode one or two or even three of Reps 1-4, the UCI information would remain in the other successfully received repetition(s). Base station 105 would perform blind detection on transmissions from UE 115 to detect the UCI in Rep 1 at uplink transmission 1102.

It should be noted that due to data arrival time or LBT failure some repetitions may not be transmitted. UE 115 can either drop or postpone an RV index if it cannot transmit one repetition due to LBT failure. Thus, where an LBT procedure fails at uplink transmission 1104, the RV index that would have been included in the UCI of Rep 2 at uplink transmission 1104 would be either dropped or postponed until the UCI of Rep 3 at uplink transmission 1106.

In a second optional implementation of the aspect illustrated at FIG. 11, UE 115 may transmit the UCI in only one of the repetitions. For example, base station 105 may derive the location of the next transmission based on transmission/demodulation reference signal (DMRS) detection at the next designated instances. In a first alternative, UE 115 may transmit the UCI with Rep 1 of the AUL transmission at uplink transmission 1102. In a second alternative, UE 115 may transmit the UCI with Rep 4, the last repetition, of AUL transmission at uplink transmission 1108. In both cases, if base station 105 misses the repetition that carries the UCI, it would likely lose the entire transmission. Accordingly, the aspect that transmits a UCI with only a single repetition may have a better opportunity for success when UE 115 is guaranteed to transmit all repetitions within the same TxOP without intervening slots that would cause UE 115 to perform an LBT procedure. The UCI can also be used to indicate to base station 105 how many repetitions have been transmitted in this scenario. Thus, at either the first repetition, Rep 1, or the last repetition, Rep 4, the UCI may include an indication that four repetitions of AUL transmissions are transmitted at uplink transmissions 1102, 1104, 1106, and 1108.

Figure 12:
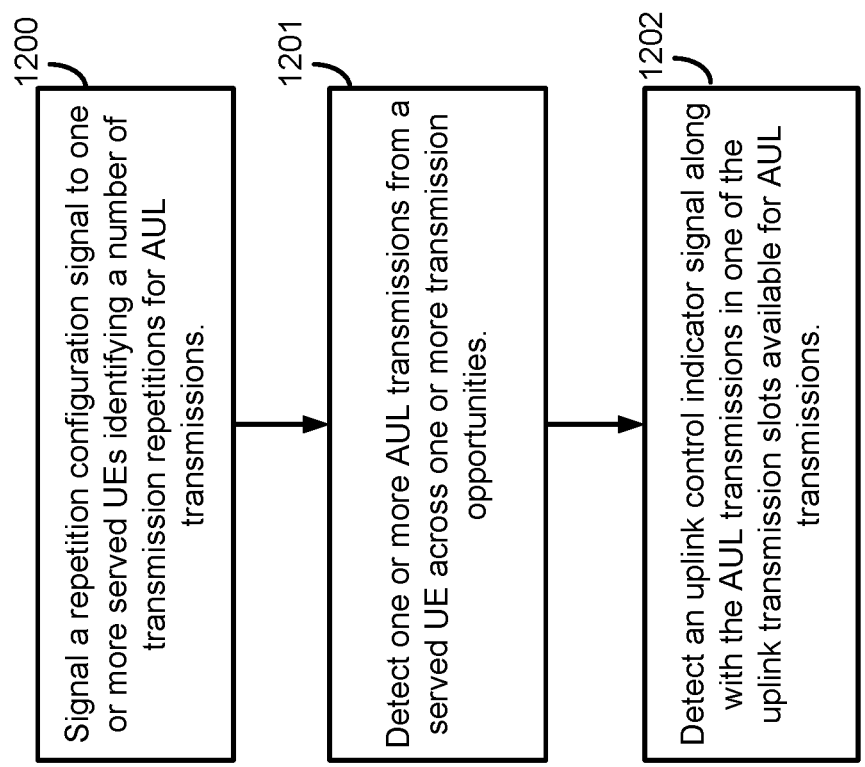
FIG. 12 is a block diagram illustrating example blocks executed by a base station to implement one aspect of the present disclosure.

FIG. 12 is a block diagram illustrating example blocks executed by a base station to implement one aspect of the present disclosure. The example blocks will also be described with respect to base station 105 as illustrated in FIG. 14.

At block 1200, a base station signals a repetition configuration signal to one or more served UEs, wherein the repetition configuration signal identifies a number of transmission repetitions for AUL transmissions of the one or more served UEs. For example, base station 105, under control of controller/processor 240, executes K-repetition logic 1406, stored in memory 242. The execution environment of K-repetition logic 1406 determines how many repetitions receives a repetition configuration signal from a serving base station via antennas 234a-t and wireless radios 1400a-t. The repetition configuration signal populates the K-repetition value at K-repetition 1307, in memory 282.

At block 1201, the base station detects one or more AUL transmissions from a served UE across one or more transmission opportunities of a shared communication spectrum. When performing communications with various served UEs, base station 105, under control of controller/processor 240, executes signal detection logic 1407. The execution environment of signal detection logic 1407 provides the functionality for base station 105 to receive signals via antennas 234a-t and wireless radios 1400a-t and decode the signals in order to detect the content of the signal or determine whether the signal is intended for base station 105 at all. Base station 105 uses the execution environment of signal detection logic 1407 to detect the AUL transmissions for one or more of the served UEs.

At block 1202, the base station detects an uplink control indicator signal along with the one or more AUL transmissions in one uplink transmission slot of a plurality of uplink transmission slots available for AUL transmissions. Within the execution environment of signal detection logic 1407, base station 105 not only will detect the AUL transmissions, but detect whether a UCI has been included with the AUL transmission. When included in the first repetition transmission, the execution environment of signal detection logic 1407 causes base station 105 to perform blind detection of the signal for any UCI. Once the UCI is detected, however, base station 105 will use the information contained within the UCI to inform of the remaining K repetition transmissions. Where the UCI is included in the final repetition transmission, base station 105 will be buffering the transmissions received from the served UE. Once the UCI has been detected, the information included in the UCI will identify the previously-transmitted AUL repetitions. Base station 105 may then pull the AUL transmissions from the data buffers for processing.

It should be noted that, instead of using the actual RV ID, various aspects of the present disclosure configure several possible RV ID sequences. UE 115 may indicate which sequence it is using via bits in the UCI. For example, UE 115 may store UCI bits which also allows for soft combining of the UCI which is not possible if the RV ID is different in each UCI transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, 8, 10, and 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), a repetition configuration signal from a serving base station, wherein the repetition configuration signal identifies a number of transmission repetitions for autonomous uplink (AUL) transmissions of the UE;

transmitting, by the UE, AUL transmission data in a plurality of uplink transmission slots across one or more transmission opportunities of a shared communication spectrum, wherein the plurality of uplink transmission slots correspond to the number of transmission repetitions;

receiving, by the UE, acknowledgement information associated with AUL transmission data; and updating, by the UE, a contention window size for a subsequent transmission opportunity based on the acknowledgement information.

2. The method of claim 1, wherein the transmitting includes transmitting the AUL transmission data in the plurality of uplink transmission slots across one transmission opportunity, and wherein the updating the contention window size includes:

determining a negative acknowledgement (NACK) rate of the acknowledgement information for each of the plurality of uplink transmission slots of AUL transmission data;

combining the NACK rate of each of the plurality of uplink transmission slots of AUL transmission data into a combined NACK rate; and determining, at a last uplink transmission slot of the plurality of uplink transmission slots of AUL transmission data, an adjustment to the contention window size based on a relationship of the combined NACK rate to a threshold rate.

3. The method of claim 2, wherein the receiving the acknowledgement information includes receiving portions of the acknowledgement information during a plurality of downlink slots of the one transmission opportunity.

4. The method of claim 1, wherein the transmitting includes transmitting the AUL transmission data across a plurality of transmission opportunities, and wherein the updating the contention window size includes:

determining a negative acknowledgement (NACK) rate of the acknowledgement information for each of the plurality of uplink transmission slots of AUL transmission data of each of the plurality of transmission opportunities; and determining, for each subsequent transmission opportunity of the plurality of transmission opportunities, an adjustment to the contention window size based on the NACK rate associated with a previous transmission opportunity of the plurality of transmission opportunities.

5. The method of claim 1, wherein the transmitting includes transmitting the AUL transmission data across a plurality of transmission opportunities, and wherein the updating the contention window size includes:

determining a negative acknowledgement (NACK) rate of the acknowledgement information for each of the plurality of uplink transmission slots of AUL transmission data across the plurality of transmission opportunities;

combining the NACK rate of each of the plurality of uplink transmission slots of AUL transmission data across the plurality of transmission opportunities into a combined NACK rate; and determining, at a last uplink transmission slot of the plurality of uplink transmission slots of AUL transmission data of a last transmission opportunity of the plurality of transmission opportunities, an adjustment to the contention window size based on a relationship of the combined NACK rate to a threshold rate.

6. The method of claim 5, wherein each transmission opportunity of the plurality of transmission opportunities with the plurality of uplink transmission slots of AUL transmission data includes a contention window sized according to an initial contention window of a first transmission opportunity of the plurality of transmission opportunities.

7. The method of claim 5, wherein a contention window for each subsequent transmission opportunity of the plurality of transmission opportunities with the plurality of uplink transmission slots of AUL transmission data is scaled by a fixed scaling factor.

8. The method of claim 7, further including:

receiving, by the UE, configuration of the fixed scaling factor from the serving base station.

9. An apparatus configured for wireless communication, the apparatus comprising:

at least one processor; and a memory coupled to the at least one processor, wherein the at least one processor is configured:

to receive, by a user equipment (UE), a repetition configuration signal from a serving base station, wherein the repetition configuration signal identifies a number of transmission repetitions for autonomous uplink (AUL) transmissions of the UE;

to transmit, by the UE, AUL transmission data in a plurality of uplink transmission slots across one or more transmission opportunities of a shared communication spectrum, wherein the plurality of uplink transmission slots correspond to the number of transmission repetitions;

to receive, by the UE, acknowledgement information associated with AUL transmission data; and to update, by the UE, a contention window size for a subsequent transmission opportunity based on the acknowledgement information.

10. The apparatus of claim 9, wherein the configuration of the at least one processor to transmit includes configuration to transmit the AUL transmission data in the plurality of uplink transmission slots across one transmission opportunity, and wherein the configuration of the at least one processor to update the contention window size includes configuration of the at least one processor:

to determine a negative acknowledgement (NACK) rate of the acknowledgement information for each of the plurality of uplink transmission slots of AUL transmission data;

to combine the NACK rate of each of the plurality of uplink transmission slots of AUL transmission data into a combined NACK rate; and to determine, at a last uplink transmission slot of the plurality of uplink transmission slots of AUL transmission data, an adjustment to the contention window size based on a relationship of the combined NACK rate to a threshold rate.

11. The apparatus of claim 10, wherein the configuration of the at least one processor to receive the acknowledgement information includes configuration to receive portions of the acknowledgement information during a plurality of downlink slots of the one transmission opportunity.

12. The apparatus of claim 9,
wherein the configuration of the at least one processor to transmit includes configuration to transmit the AUL transmission data across a plurality of transmission opportunities, and
wherein the configuration of the at least one processor to update the contention window size include configuration of the at least one processor s:
to determine a negative acknowledgement (NACK) rate of the acknowledgement information for each of the plurality of uplink transmission slots of AUL transmission data of each of the plurality of transmission opportunities; and
to determine, for each subsequent transmission opportunity of the plurality of transmission opportunities, an adjustment to the contention window size based on the NACK rate associated with a previous transmission opportunity of the plurality of transmission opportunities.

13. The apparatus of claim 9,
wherein the configuration of the at least one processor to transmit includes configuration to transmit the AUL transmission data across a plurality of transmission opportunities, and
wherein the configuration of the at least one processor to update the contention window size include configuration of the at least one processor s:
to determine a negative acknowledgement (NACK) rate of the acknowledgement information for each of the plurality of uplink transmission slots of AUL transmission data across the plurality of transmission opportunities;
to combine the NACK rates of each of the plurality of uplink transmission slots of AUL transmission data across the plurality of transmission opportunities into a combined NACK rate; and
to determine, at a last uplink transmission slot of the plurality of uplink transmission slots of AUL transmission data of a last transmission opportunity of the plurality of transmission opportunities, an adjustment to the contention window size based on a relationship of the combined NACK rate to a threshold rate.

14. The apparatus of claim 13, wherein each transmission opportunity of the plurality of transmission opportunities with the plurality of uplink transmission slots of AUL transmission data includes a contention window sized according to an initial contention window of a first transmission opportunity of the plurality of transmission opportunities.

15. The apparatus of claim 13, wherein a contention window for each subsequent transmission opportunity of the plurality of transmission opportunities with the plurality of uplink transmission slots of AUL transmission data is scaled by a fixed scaling factor.

16. The apparatus of claim 15, further including configuration of the at least one processor to receive, by the UE, configuration of the fixed scaling factor from the serving base station.

17. A non-transitory computer-readable medium storing instructions that, when executed by a processor, cause the processor to perform operations comprising:
receiving, by a user equipment (UE), a repetition configuration signal from a serving base station, wherein the repetition configuration signal identifies a number of transmission repetitions for autonomous uplink (AUL) transmissions of the UE;
transmitting, by the UE, AUL transmission data in a plurality of uplink transmission slots across one or more transmission opportunities of a shared communication spectrum, wherein the plurality of uplink transmission slots correspond to the number of transmission repetitions;
receiving, by the UE, acknowledgement information associated with AUL transmission data; and
updating, by the UE, a contention window size for a subsequent transmission opportunity based on the acknowledgement information.

18. The non-transitory computer-readable medium of claim 17,
wherein the transmitting includes transmitting the AUL transmission data in the plurality of uplink transmission slots across one transmission opportunity, and
wherein the updating the contention window size includes:
determining a negative acknowledgement (NACK) rate of the acknowledgement information for each of the plurality of uplink transmission slots of AUL transmission data;
combining the NACK rate of each of the plurality of uplink transmission slots of AUL transmission data into a combined NACK rate; and
determining, at a last uplink transmission slot of the plurality of uplink transmission slots of AUL transmission data, an adjustment to the contention window size based on a relationship of the combined NACK rate to a threshold rate.

19. The non-transitory computer-readable medium of claim 18, wherein the receiving the acknowledgement information includes receiving portions of the acknowledgement information during a plurality of downlink slots of the one transmission opportunity.

20. The non-transitory computer-readable medium of claim 17,
wherein the transmitting includes transmitting the AUL transmission data across a plurality of transmission opportunities, and
wherein the updating the contention window size includes:
determining a negative acknowledgement (NACK) rate of the acknowledgement information for each of the plurality of uplink transmission slots of AUL transmission data of each of the plurality of transmission opportunities; and
determining, for each subsequent transmission opportunity of the plurality of transmission opportunities, an adjustment to the contention window size based on the NACK rate associated with a previous transmission opportunity of the plurality of transmission opportunities.

21. The non-transitory computer-readable medium of claim 17,
wherein the transmitting includes transmitting the AUL transmission data across a plurality of transmission opportunities, and
wherein the updating the contention window size includes:
determining a negative acknowledgement (NACK) rate of the acknowledgement information for each of the plurality of uplink transmission slots of AUL transmission data across the plurality of transmission opportunities;

combining the NACK rate of each of the plurality of uplink transmission slots of AUL transmission data across the plurality of transmission opportunities into a combined NACK rate; and determining, at a last uplink transmission slot of the plurality of uplink transmission slots of AUL transmission data of a last transmission opportunity of the plurality of transmission opportunities, an adjustment to the contention window size based on a relationship of the combined NACK rate to a threshold rate.

22. The non-transitory computer-readable medium of claim 21, wherein each transmission opportunity of the plurality of transmission opportunities with the plurality of uplink transmission slots of AUL transmission data includes a contention window sized according to an initial contention window of a first transmission opportunity of the plurality of transmission opportunities.

23. The non-transitory computer-readable medium of claim 21, wherein a contention window for each subsequent transmission opportunity of the plurality of transmission opportunities with the plurality of uplink transmission slots of AUL transmission data is scaled by a fixed scaling factor.

24. The non-transitory computer-readable medium of claim 23, further including:

receiving, by the UE, configuration of the fixed scaling factor from the serving base station.

25. An apparatus configured for wireless communication, the apparatus comprising:

means for receiving, by a user equipment (UE), a repetition configuration signal from a serving base station, wherein the repetition configuration signal identifies a number of transmission repetitions for autonomous uplink (AUL) transmissions of the UE;

means for transmitting, by the UE, AUL transmission data in a plurality of uplink transmission slots across one or more transmission opportunities of a shared communication spectrum, wherein the plurality of uplink transmission slots correspond to the number of transmission repetitions;

means for receiving, by the UE, acknowledgement information associated with AUL transmission data; and means for updating, by the UE, a contention window size for a subsequent transmission opportunity based on the acknowledgement information.

26. The apparatus of claim 25, wherein the means for transmitting include means for transmitting the AUL transmission data in the plurality of uplink transmission slots across one transmission opportunity, and wherein the means for updating the contention window size include:

means for determining a negative acknowledgement (NACK) rate of the acknowledgement information for each of the plurality of uplink transmission slots of AUL transmission data;

means for combining the NACK rate of each of the plurality of uplink transmission slots of AUL transmission data into a combined NACK rate; and means for determining, at a last uplink transmission slot of the plurality of uplink transmission slots of AUL transmission data, an adjustment to the contention window size based on a relationship of the combined NACK rate to a threshold rate.

27. The apparatus of claim 26, wherein the means for receiving the acknowledgement information include means for receiving portions of the acknowledgement information during a plurality of downlink slots of the one transmission opportunity.

28. The apparatus of claim 25, wherein the means for transmitting include means for transmitting the AUL transmission data across a plurality of transmission opportunities, and wherein the means for updating the contention window size include:

means for determining a negative acknowledgement (NACK) rate of the acknowledgement information for each of the plurality of uplink transmission slots of AUL transmission data of each of the plurality of transmission opportunities; and means for determining, for each subsequent transmission opportunity of the plurality of transmission opportunities, an adjustment to the contention window size based on the NACK rate associated with a previous transmission opportunity of the plurality of transmission opportunities.

29. The apparatus of claim 25, wherein the means for transmitting include means for transmitting the AUL transmission data across a plurality of transmission opportunities, and wherein the means for updating the contention window size include:

means for determining a negative acknowledgement (NACK) rate of the acknowledgement information for each of the plurality of uplink transmission slots of AUL transmission data across the plurality of transmission opportunities;

means for combining the NACK rate of each of the plurality of uplink transmission slots of AUL transmission data across the plurality of transmission opportunities into a combined NACK rate; and means for determining, at a last uplink transmission slot of the plurality of uplink transmission slots of AUL transmission data of a last transmission opportunity of the plurality of transmission opportunities, an adjustment to the contention window size based on a relationship of the combined NACK rate to a threshold rate.

30. The apparatus of claim 29, wherein each transmission opportunity of the plurality of transmission opportunities with the plurality of uplink transmission slots of AUL transmission data includes a contention window sized according to an initial contention window of a first transmission opportunity of the plurality of transmission opportunities.

* * * * *